(12) United States Patent
Kang et al.

(10) Patent No.: US 10,202,040 B2
(45) Date of Patent: Feb. 12, 2019

(54) USER INTERFACE APPARATUS FOR VEHICLE, METHOD OF MANUFACTURING USER INTERFACE APPARATUS, AND VEHICLE

(71) Applicant: LG Electronics Inc., Seoul (KR)

(72) Inventors: Hyungoo Kang, Seoul (KR); Jihyun Kim, Seoul (KR); Yeonji Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/856,369

(22) Filed: Dec. 28, 2017

(65) Prior Publication Data

US 2018/0251032 A1 Sep. 6, 2018

(30) Foreign Application Priority Data

Mar. 6, 2017 (KR) .................. 10-2017-0028496

(51) Int. Cl.
*F21V 9/00* (2018.01)
*B60K 37/02* (2006.01)
(Continued)

(52) U.S. Cl.
CPC ........... *B60K 37/02* (2013.01); *B60K 37/06* (2013.01); *F21V 9/08* (2013.01); *F21V 11/08* (2013.01); *G02B 6/0028* (2013.01); *G02B 6/0068* (2013.01); *G09F 13/04* (2013.01); *H01H 13/023* (2013.01); *B60K 2350/1024* (2013.01); *B60K 2350/1028* (2013.01); *B60K 2350/1036* (2013.01); *B60K 2350/203* (2013.01); *B60K 2350/2039* (2013.01);
(Continued)

(58) Field of Classification Search
CPC ................. F21V 9/00; F21V 2200/00
USPC ......................... 362/511, 509, 459
See application file for complete search history.

(56) References Cited

U.S. PATENT DOCUMENTS

2005/0052426 A1* 3/2005 Hagermoser .......... B60K 35/00
345/173
2018/0013427 A1* 1/2018 Okada .................... H01H 13/18

FOREIGN PATENT DOCUMENTS

EP    2208645      7/2010
JP    2011019112   1/2011
(Continued)

OTHER PUBLICATIONS

Extended European Search Report in European Application No. 18159971.3, dated Jul. 16, 2018, 18 pages.

*Primary Examiner* — Edwyn Labaze
(74) *Attorney, Agent, or Firm* — Fish & Richardson P.C.

(57) ABSTRACT

A user interface apparatus for a vehicle includes: a circuit part injection-molded body formed in an insert injection process in which first resin melt is injected while a circuit part is inserted; and a cover part injection-molded body coupled to the circuit part injection-molded body, and formed in an insert injection process in which second resin melt is injected while a cover part is inserted. The circuit part includes: a light emitting unit; a touch sensor that detects a touch input; and at least one processor that controls the light emitting unit in response to an event to generate light; activates the touch sensor in response to generation of the light; and generates a signal for controlling a vehicle device in response to a touch input. The cover part allows light generated by the light emitting unit to pass therethrough and illuminate a shape on the cover part.

23 Claims, 25 Drawing Sheets

(51) Int. Cl.
*F21V 8/00* (2006.01)
*F21V 9/08* (2018.01)
*F21V 11/08* (2006.01)
*B60K 37/06* (2006.01)
*G09F 13/04* (2006.01)
*H01H 13/02* (2006.01)
*F21W 106/00* (2018.01)
*F21W 107/10* (2018.01)

(52) U.S. Cl.
CPC ............... *B60K 2350/2043* (2013.01); *B60K 2350/302* (2013.01); *F21W 2106/00* (2018.01); *F21W 2107/10* (2018.01); *G09F 2013/044* (2013.01)

(56) References Cited

FOREIGN PATENT DOCUMENTS

| | | |
|---|---|---|
| JP | 5349176 | 11/2013 |
| JP | KR1020150018567 | 2/2015 |
| JP | 2016196154 | 11/2016 |
| WO | WO2013058708 | 4/2013 |

\* cited by examiner

FIG. 1
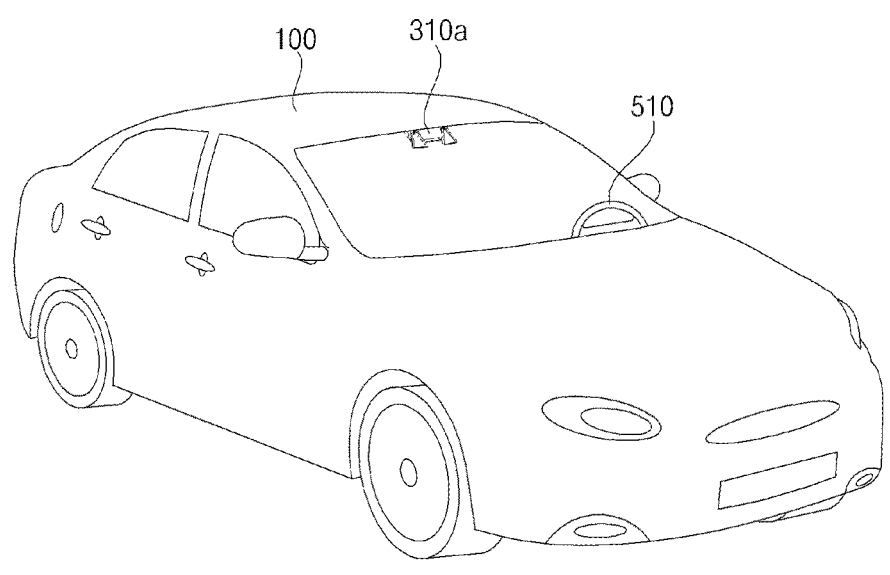
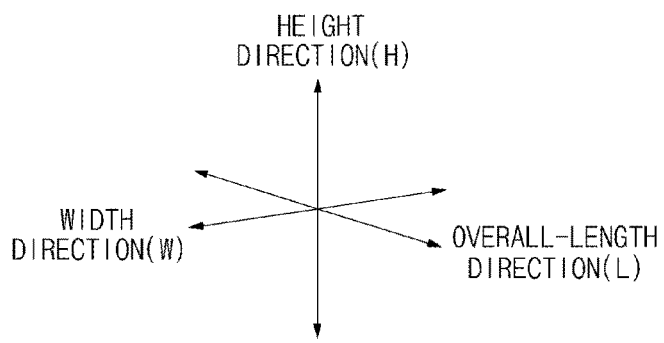

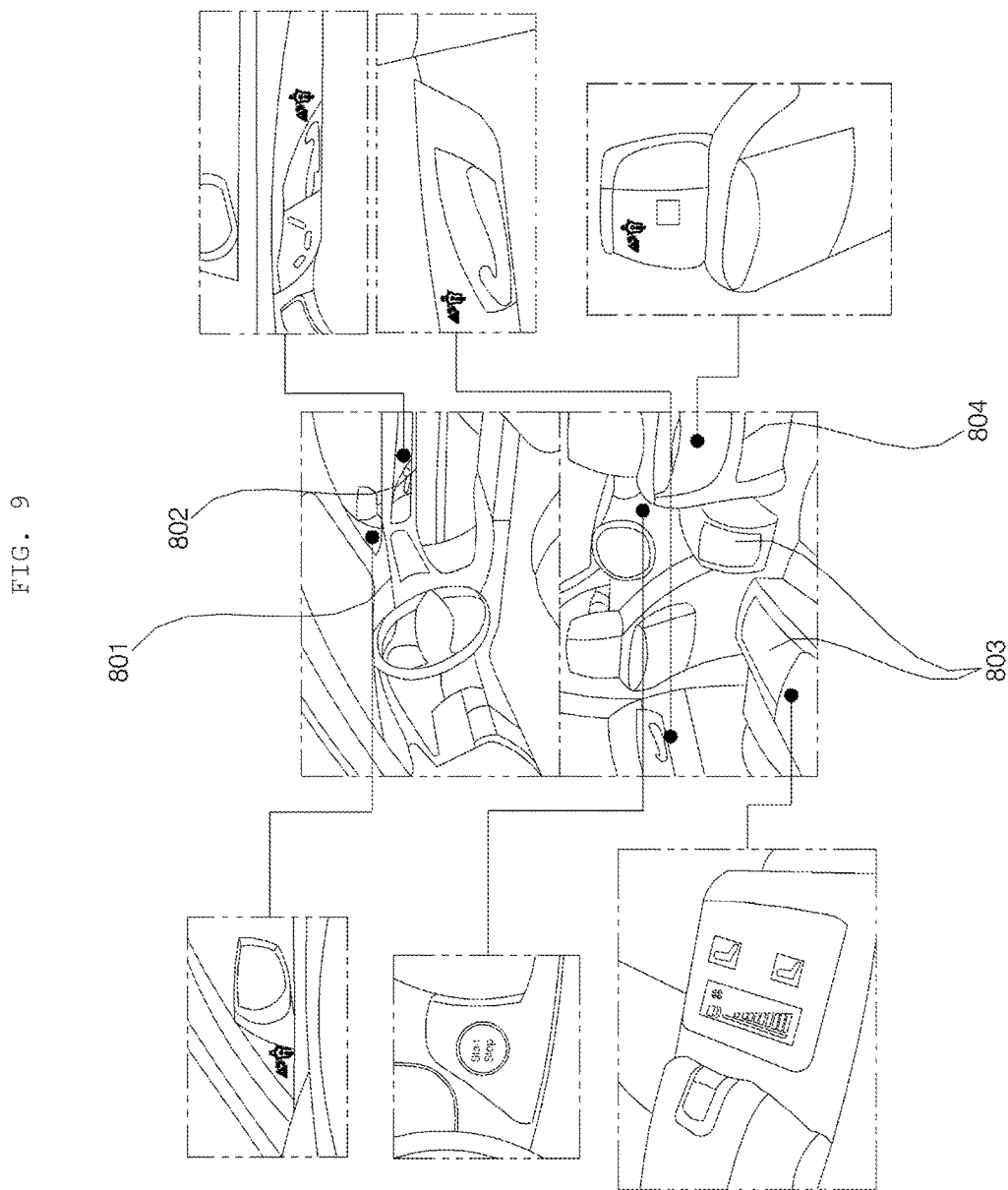

USER INTERFACE APPARATUS FOR VEHICLE, METHOD OF MANUFACTURING USER INTERFACE APPARATUS, AND VEHICLE

CROSS-REFERENCE TO RELATED APPLICATION

This application claims the benefit of an earlier filing date and right of priority to Korean Patent Application No. 10-2017-0028496, filed on Mar. 6, 2017 in the Korean Intellectual Property Office, the disclosure of which is incorporated herein by reference.

TECHNICAL FIELD

The present disclosure relates to a user interface apparatus for vehicle, and a method for manufacturing the same.

BACKGROUND

A vehicle is an apparatus that moves in a direction desired by a user riding therein. A representative example of a vehicle may be an automobile.

A variety of sensors and electronic devices are typically mounted in vehicles for the convenience of a user who uses the vehicle. For example, for user driving convenience, an Advanced Driver Assistance System (ADAS) has been actively studied. In addition, efforts have been being made to develop autonomous vehicles.

SUMMARY

Implementations are disclosed herein that enable a user interface apparatus for a vehicle and a method of manufacturing the user interface apparatus.

In one aspect, a user interface apparatus for a vehicle includes: a circuit part injection-molded body formed in an insert injection process in which first resin melt is injected in a state in which a circuit part has been inserted; and a cover part injection-molded body coupled to the circuit part injection-molded body, and formed in an insert injection process in which second resin melt is injected in a state in which a cover part has been inserted. The circuit part includes: a light emitting unit; a touch sensor configured to detect a touch input; at least one processor; and a computer-readable medium having stored thereon instructions that, when executed by the at least one processor, cause the at least one processor to perform operations including: controlling the light emitting unit in response to an event to generate light; activating the touch sensor in response to generation of the light; and generating a signal for controlling a vehicle device in response to a touch input received via the activated touch sensor. The user interface apparatus also includes a transparent flexible printed circuit board on which the light emitting unit, the touch sensor, the at least one processor, and the computer-readable medium are arranged. In a state in which the light is generated by the light emitting unit, the cover part allows the light to pass therethrough and illuminate a shape on the cover part.

In some implementations, the user interface apparatus further includes: a light diffusion member that is formed by injecting the first resin melt and that is configured to transmit the light that is generated by the light emitting unit toward the cover part.

In some implementations, the light diffusion member is formed to cover a light-emitting portion of the light emitting unit.

In some implementations, the light diffusion member is formed to surround the light emitting unit.

In some implementations, the user interface apparatus further includes: a buffer member that is formed by injecting the second resin melt and that is configured to form a smoothed surface over at least one protrusion in the circuit part.

In some implementations, the buffer member is formed of a transparent material.

In some implementations, the cover part is formed to surround an edge of the buffer member.

In some implementations, the user interface apparatus further includes: a plastic portion configured to support reflection of the light generated by the light emitting unit.

In some implementations, the plastic portion is formed in an insert injection process in which a third resin melt is injected in a state in which the circuit part injection-molded body and the cover part injection-molded body have been inserted.

In some implementations, the light emitting unit includes a plurality of light sources respectively disposed in a plurality of separate regions, and the cover part includes a plurality of patterns which is formed to respectively correspond to the plurality of light sources. Light that is generated by the plurality of respective light sources pass through the plurality of patterns, and the plastic portion is configured to block light, generated by the plurality of respective light sources, from leaking from the plurality of separate regions to an outside of the user interface apparatus.

In some implementations, the cover part injection-molded body further includes a buffer member that is formed by injecting the second resin melt and that is configured to form a smoothed surface over at least one protrusion in the circuit part. The plastic portion is formed to surround an edge of the buffer member.

In some implementations, the plastic portion includes a coupling assembly that is configured to couple with a vehicle component.

In some implementations, the cover part includes: a pattern part including a pattern that corresponds to the shape that is configured to be illuminated on the cover part, the pattern part configured to allow the light to pass through the pattern; and a film part having a predetermined light transmissivity rate and configured to allow light, passing through the pattern, to be output to an outside of the user interface apparatus.

In some implementations, the cover part further includes a surface that is formed on the film part and that is formed of a synthetic resin material, a fabric material, a leather material, a wooden material, or a metal material. A region of the surface corresponding to the pattern is thinner than a region of the surface not corresponding to the pattern.

In some implementations, the user interface apparatus further includes a light guide film configured to transfer light, generated by the light emitting unit, to the cover part.

In some implementations, the light guide film is configured to uniformly transfer the light, generated by the light emitting unit, to the cover part and illuminate the shape on the cover part.

In some implementations, the user interface apparatus further includes an optical clear film configured to guide the light, generated by the light emitting unit, to the light guide film.

In some implementations, the user interface apparatus further includes: a color film configured to change a wavelength of light generated by the light emitting unit.

In some implementations, the operations further include: based on a first touch input being detected by the touch sensor, controlling the light emitting unit to generate light in response to the first touch; and based on a second touch input being detected by the touch sensor, providing a signal for controlling a vehicle device in response to the second touch.

In another aspect, a vehicle includes: a plurality of wheels; a power source configured to drive at least one of the plurality of wheels; and a user interface apparatus. The user interface apparatus includes: a circuit part injection-molded body formed in an insert injection process in which first resin melt is injected in a state in which a circuit part has been inserted; and a cover part injection-molded body coupled to the circuit part injection-molded body, and formed in an insert injection process in which second resin melt is injected in a state in which a cover part has been inserted. The circuit part includes: a light emitting unit; a touch sensor configured to detect a touch input; and at least one processor configured to: control the light emitting unit in response to an event to generate light; activate the touch sensor in response to generation of the light; and generate a signal for controlling a vehicle device in response to a touch input received via the activated touch sensor. The user interface apparatus also includes a transparent flexible printed circuit board on which the light emitting unit, the touch sensor, and the at least one processor are arranged. In a state in which the light is generated by the light emitting unit, the cover part allows the light to pass therethrough and illuminate a shape on the cover part.

In another aspect, a method of manufacturing a user interface apparatus for vehicle includes: manufacturing a circuit part injection-molded body in an insert injection process in which first resin melt is injected in a state in which a circuit part has been inserted into a first mold; manufacturing a cover part injection-molded body in an insertion injection process in which second resin melt is injected when in a state in which a cover part has been inserted into a second mold; and bonding the circuit injection-molded body and the cover part injection-molded body. The method of manufacturing further includes: performing an insert injection process in which a third resin melt is injected in a state in which the circuit part injection-molded body and the cover part injection-molded body have been inserted into a third mold while being bonded to each other. The circuit part includes: a light emitting unit; a touch sensor configured to detect a touch input; at least one processor; and a transparent flexible printed circuit board on which the light emitting unit, the touch sensor, and the at least one processor are arranged. In a state in which light is generated by the light emitting unit in response to a touch input received by the touch sensor, the cover part allows the light to pass therethrough and illuminate a shape on the cover part.

In another aspect, a user interface apparatus for a vehicle includes: a circuit part injection-molded body including a first resin melt and a circuit part; and a cover part injection-molded body coupled to the circuit part injection-molded body, and including a second resin melt and a cover part. The circuit part includes: a light emitting unit; a touch sensor configured to detect a touch input; at least one processor; and a computer-readable medium having stored thereon instructions that, when executed by the at least one processor, cause the at least one processor to perform operations that include: controlling the light emitting unit in response to an event to generate light; activating the touch sensor in response to generation of the light; and generating a signal for controlling a vehicle device in response to a touch input received via the activated touch sensor. The user interface apparatus also includes a transparent flexible printed circuit board on which the light emitting unit, the touch sensor, the at least one processor, and the computer-readable medium are arranged. In a state in which the light is generated by the light emitting unit, the cover part allows the light to pass therethrough and illuminate a shape on the cover part.

In some implementations, the user interface apparatus further includes: a light diffusion member that includes the first resin melt arranged around the light emitting unit and that is configured to transmit the light that is generated by the light emitting unit toward the cover part.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 1 is a diagram illustrating an example of an external appearance of a vehicle according to an implementation;

FIG. 9 is a diagram illustrating an example of a location of a user interface apparatus for a vehicle according to an implementation;

DETAILED DESCRIPTION

Figure 2:
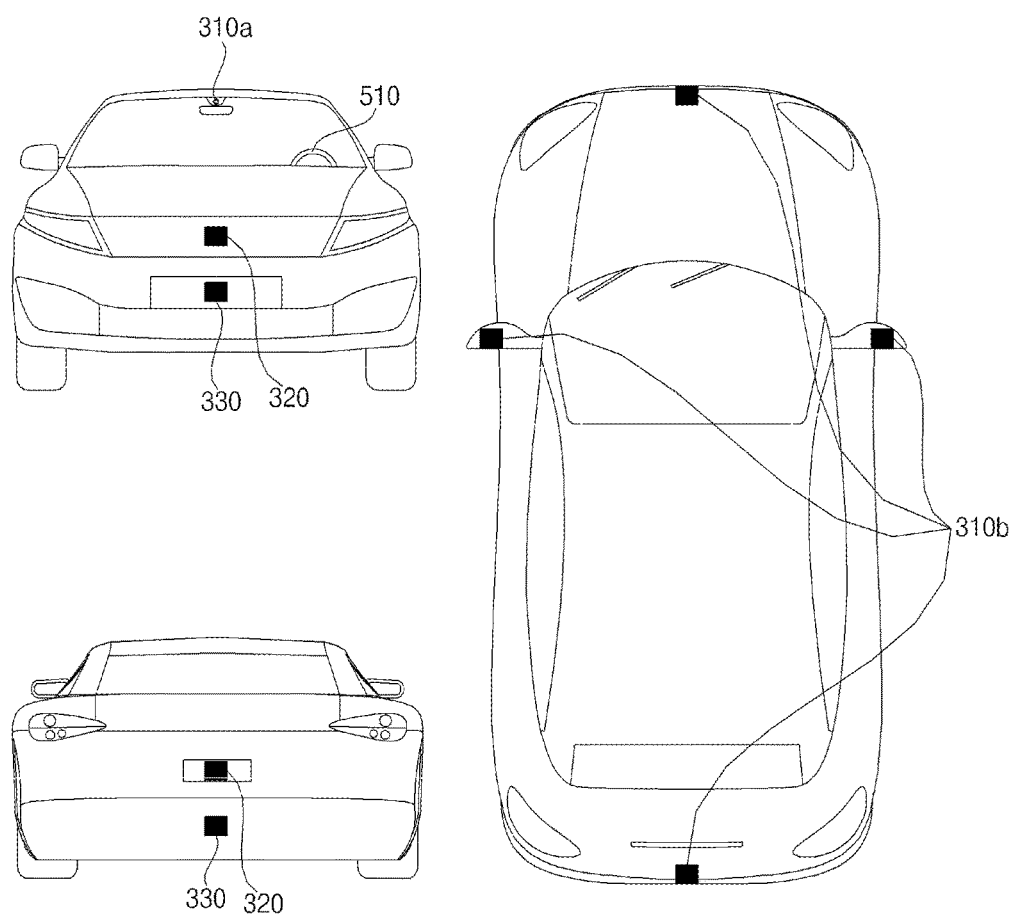
FIG. 2 is a diagram illustrating an example of different angled views of the external appearance of a vehicle according to an implementation.

A vehicle may include various types of user interface apparatuses providing an interface between the vehicle and a user. Such user interface apparatuses for vehicle may include various input units and output units.

However, in some scenarios, the input units of a user interface apparatus may pose challenges to usability, design, and manufacturing efficiency. For example, either the location, functionality, or design of an input unit may cause the input unit to receive an input that was unintended by a user. In addition, the input unit may have a design that is incompatible or otherwise troublesome when it comes to designing the interior of the vehicle.

In addition, if a user interface apparatus implements various components, such as various types of circuitry, the size or thickness of the user interface apparatus may increase. Such increase in size can reduce design freedom for vehicle styling, and may require other components coupled to the user interface apparatus to be manufactured in conjunction with the user interface apparatus.

Implementations are disclosed herein that may overcome such challenges by providing an input unit for a user interface apparatus that can be adaptively activated, for example only when appropriate or necessary, to receive a user input. In addition, the user interface apparatus may be configured to have a slim design that blends in with the interior surroundings of the vehicle.

It is another object of the present disclosure to provide a vehicle including such a user interface apparatus.

In some scenarios, implementations of the present disclosure may have one or more effects as follows.

First, the user interface apparatus may be configured so that an input unit is activated only in appropriate scenarios to receive a user input, so as to mitigate unintended or accidental inputs by a user.

Second, when a user interface apparatus is not activated, the exterior of the user interface apparatus may have an appearance that is integrated into the surrounding interior of a vehicle, providing a seamless design.

Third, the user interface apparatus may be designed to enable fast and efficient production of the user interface apparatus.

In addition, in some scenarios, the user interface apparatus provides a slim design that is integrated into the interior of a vehicle.

Effects of the present disclosure are not limited to the aforementioned effects and other unmentioned effects will be clearly understood by those skilled in the art from the claims.

A vehicle as described in this specification may include any suitable vehicle, such as an automobile or a motorcycle. Hereinafter, a description will be given based on an automobile.

A vehicle as described in this specification may be powered by any suitable power source, and may include an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 3:
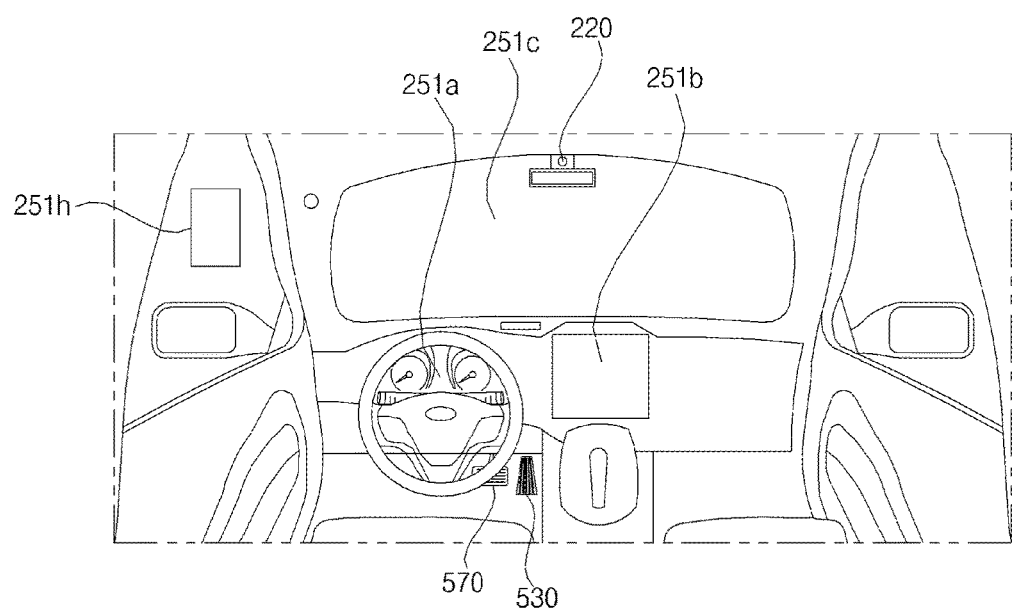
FIGS. 3 and 4 are diagrams illustrating examples of an interior configuration of a vehicle according to an implementation.
Figure 4:
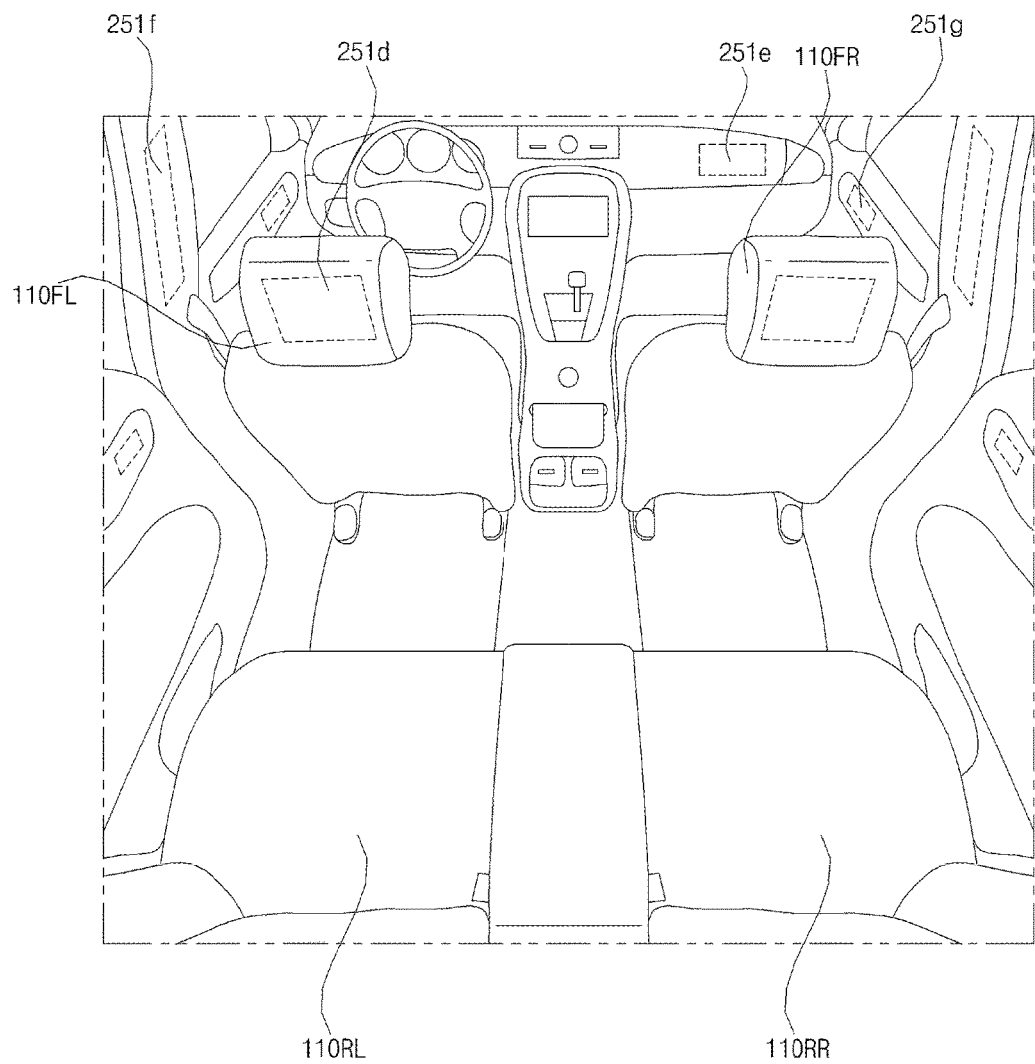
Figure 5:
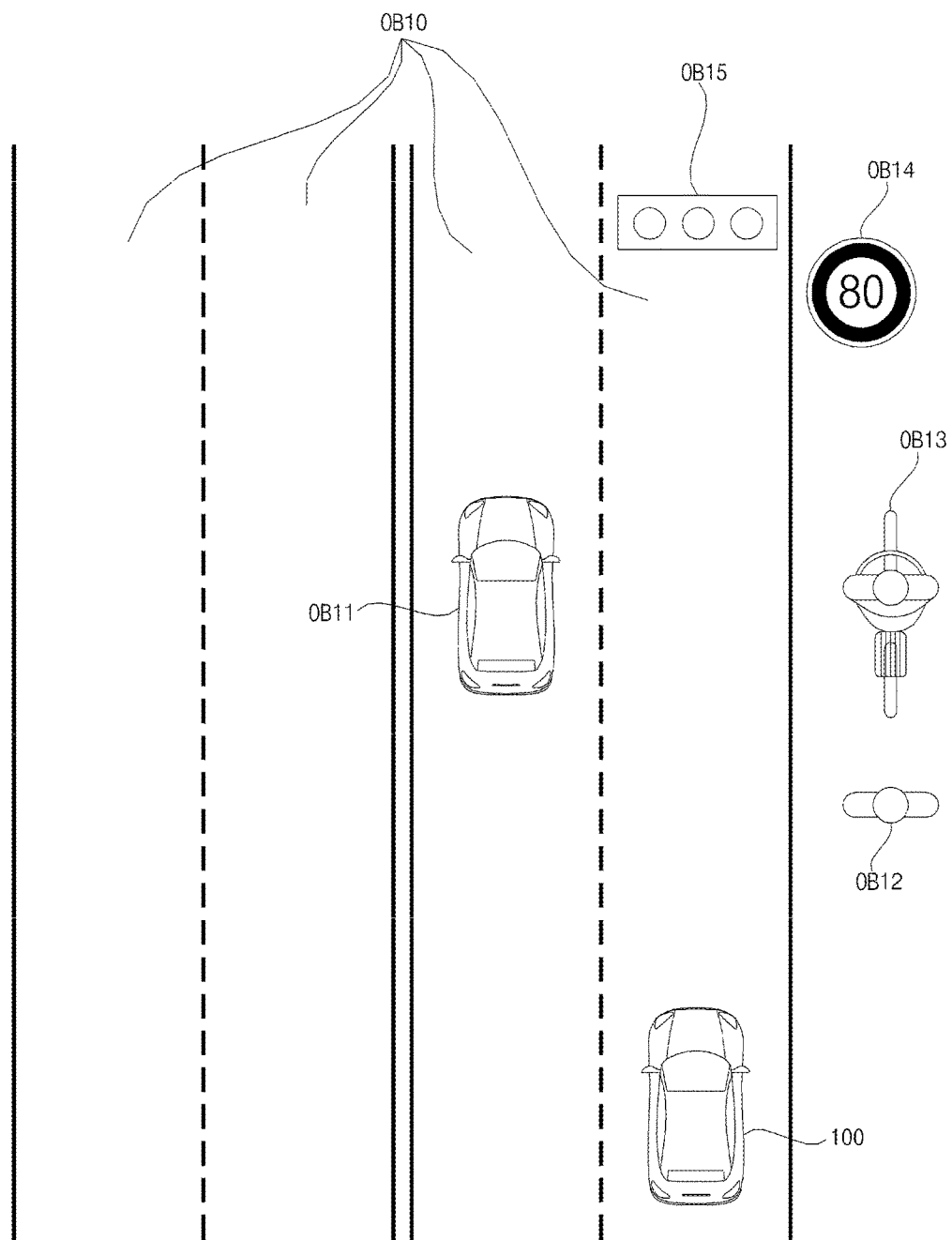
FIGS. 5 and 6 are diagrams illustrating examples of an object detected by a vehicle according to an implementation.
Figure 6:
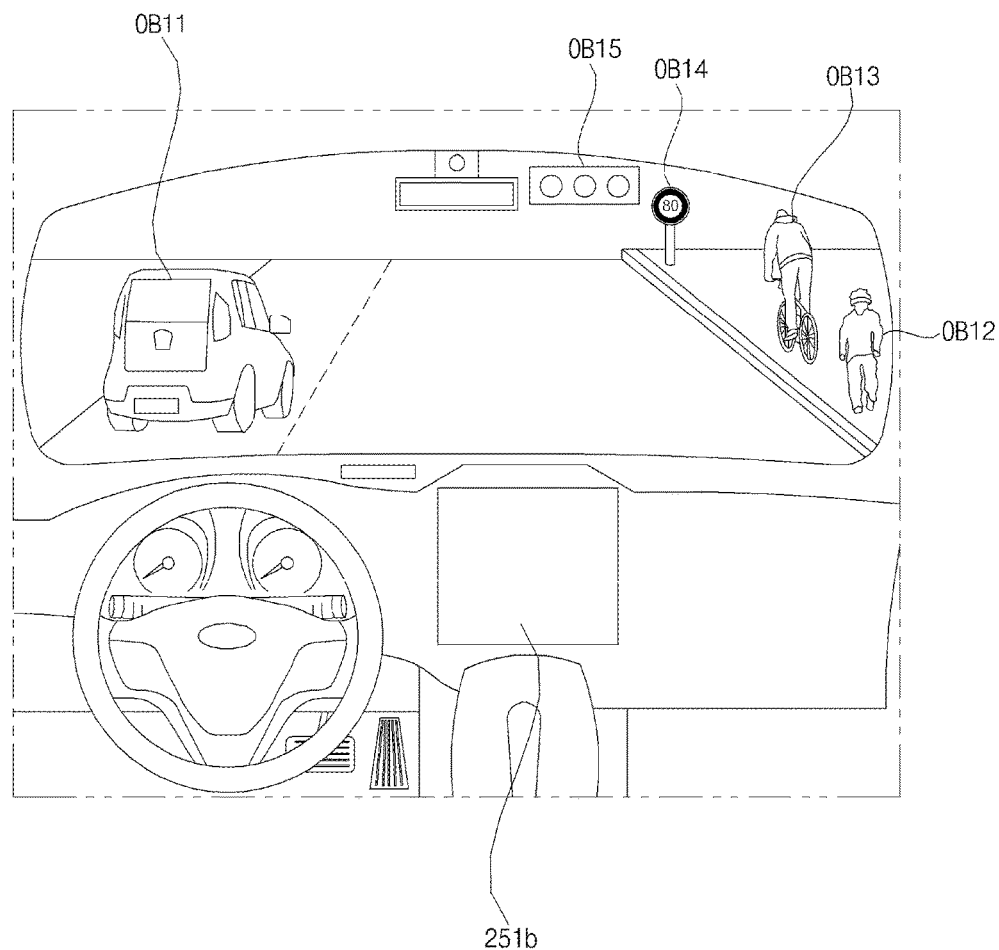
Figure 7:
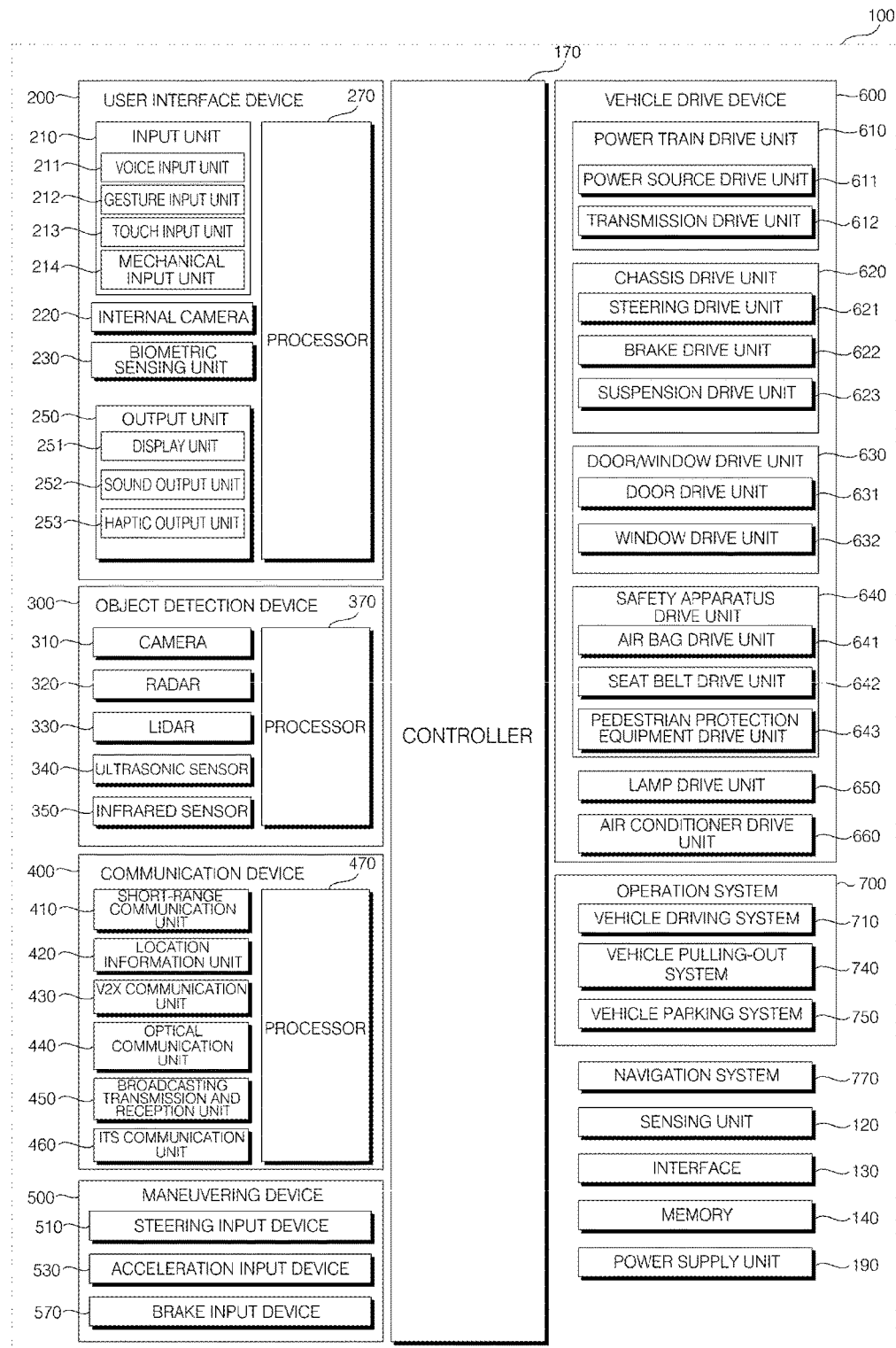
FIG. 7 is a block diagram illustrating an example of a vehicle according to an implementation.

FIG. 1 is a diagram illustrating the external appearance of a vehicle according to an implementation. FIG. 2 is different angled views of a vehicle according to an implementation. FIGS. 3 and 4 are diagrams illustrating the internal configuration of a vehicle according to an implementation. FIGS. 5 and 6 are diagrams for explanation of objects according to an implementation. FIG. 7 is a block diagram illustrating a vehicle according to an implementation.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through a user interface apparatus 200, the vehicle 100 may be switched from a manual mode to an autonomous driving mode, or vice versa.

The vehicle 100 may be switched to the autonomous driving mode or to the manual mode based on driving situation information.

The driving situation information may include at least one of the following: information on an object located outside the vehicle 100, navigation information, and vehicle state information.

For example, the vehicle 100 may be switched from the manual mode to the autonomous driving mode, or vice versa, based on driving situation information generated by an object detection apparatus 300.

In another example, the vehicle 100 may be switched from the manual mode to the autonomous driving mode, or vice versa, based on driving situation information received through a communication apparatus 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation apparatus 500. In response to the user input received through the driving manipulation apparatus 500, the vehicle 100 may operate.

The term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the operation system 700, a navigation system 770, a sensing unit 120, an interface 130, a memory 140, at least one processor such as controller 170, and a power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and at least one processor such as processor 270.

In some implementations, the user interface apparatus 200 may further include other components in addition to the aforementioned components, or may not include some of the aforementioned components.

The input unit 210 is configured to receive information from a user, and data collected by the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In the case where the user interface apparatus 200 does not include the processor 270, the user interface apparatus 200 may operate under control of the controller 170 or a processor of another device inside the vehicle 100.

In some implementations, the user interface apparatus 200 may be referred to as a display device for vehicle.

The user interface apparatus 200 may operate under control of the controller 170.

The object detection apparatus 300 is configured to detect an object outside the vehicle 100. The objection detection apparatus 300 may generate object information based on sensing data.

The object information may include information about the presence of an object, location information of the object, information on a distance between the vehicle 100 and the object, and information on a speed of the vehicle relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a telephone pole, a traffic light, and a bridge.

The geographical feature may include a mountain, a hill, etc.

In some implementations, the object may be classified as a movable object or a stationary object. For example, the movable object may include a nearby vehicle and a pedestrian. For example, the stationary object may include a traffic signal, a road, and a structure.

The object detection apparatus 300 may include a camera 310, a radar 320, a lidar 330, an ultrasonic sensor 340, an infrared sensor 350, and at least one processor such as processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by utilizing a pin hole model or profiling a road surface.

For example, the camera 310 may acquire the information on a distance to the object and the information on the speed relative to the object, based on information on disparity in stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100. The vehicle 100 may include a plurality of non-drive type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. Using an image processing algorithm, the processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or a processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In the case where the communication apparatus 400 does not include the processor 470, the communication apparatus 400 may operate under control of the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may operate under control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, in the case where the operation system 700 is implemented as software, the operation system 700 may be implemented by one or more processors, such as the controller 170.

In some implementations, the operation system 700 may include at least one selected from among the user interface apparatus 270, the object detection apparatus 300, the communication apparatus 400, the driving manipulation apparatus 500, the vehicle drive apparatus 600, the navigation system 770, the sensing unit 120, or the controller 170.

The driving system 710 may perform driving of the vehicle 100.

The driving system 710 may perform driving of the vehicle 100 by providing a control signal to the vehicle drive apparatus 600 in response to reception of navigation information from the navigation system 770.

The driving system 710 may perform driving of the vehicle 100 by providing a control signal to the vehicle drive apparatus 600 based on object information received from the object detection apparatus 300.

The driving system 710 may perform driving of the vehicle 100 by providing a control signal to the vehicle drive apparatus 600 in response to reception of a signal from an external device through the communication apparatus 400.

The driving system 710 may be a system which includes at least one of the user interface apparatus 270, the object detection apparatus 300, the communication apparatus 400, the driving manipulation apparatus 500, the vehicle drive apparatus 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 in response to reception of navigation information from the navigation system 770.

The parking-out system 740 may perform an operation of pulling the vehicle 100 out of a parking space, by providing a control signal to the vehicle drive apparatus 600 based on object information received from the object detection apparatus 300.

The parking-out system 740 may perform an operation of pulling the vehicle 100 out of a parking space, by providing a control signal to the vehicle drive apparatus 600 based on a signal received from an external device.

The parking-out system 740 may be a system which includes at least one of the user interface apparatus 270, the object detection apparatus 300, the communication apparatus 400, the driving manipulation apparatus 500, the vehicle drive apparatus 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive apparatus 600 in response to reception of navigation information from the navigation system 770.

The parking system 750 may perform an operation of parking the vehicle 100 in a parking space, by providing a control signal to the vehicle drive apparatus 600 based on object information received from the object detection apparatus 300.

The parking system 750 may perform an operation of parking the vehicle 100 in a parking space, by providing a control signal to the vehicle drive apparatus 600 in response to reception of a signal from an external device.

The parking system 750 may be a system which includes at least one of the user interface apparatus 270, the object detection apparatus 300, the communication apparatus 400, the driving manipulation apparatus 500, the vehicle drive apparatus 600, the navigation system 770, the sensing unit 120, and the controller 170, and which performs an operation of parking the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8A:
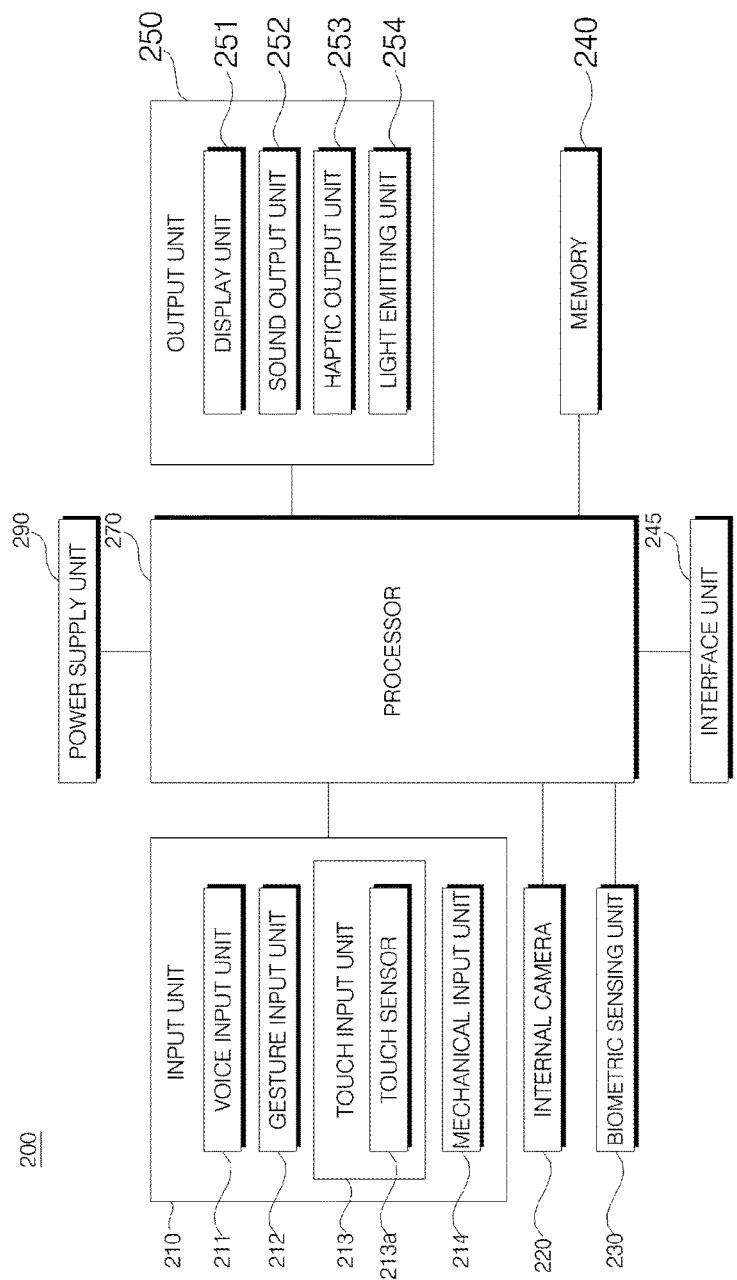
FIG. 8A is a block diagram illustrating an example of a vehicle user interface according to an implementation.

FIG. 8A is a block diagram illustrating a vehicle user interface according to an implementation.

Referring to FIG. 8A, a vehicle user interface 200 may include an input unit 210, an internal camera 220, a biometric sensing unit 230, a memory 240, an interface unit 245, an output unit 250, a processor 270, and a power supply unit 290.

In some implementations, the user interface apparatus 200 may further include other components to the aforementioned components, or may not include some of the aforementioned components.

In some implementations, the description about the user interface apparatus for vehicle described above with reference to FIG. 7 can be applied to the user interface apparatus for vehicle described with reference to FIG. 8A. Referring to FIG. 8A, the user interface apparatus will be described mainly about difference from the user interface apparatus shown in FIG. 7.

The input unit 210 may include a voice input unit 211, a gesture input unit 212, a touch input unit 213, and a mechanic input unit 214.

The touch input unit 213 may include a touch sensor 213a.

The touch sensor 213a may sense a user's touch. A touch sensed by the touch sensor 213a may be defined as a touch input.

The touch sensor 213a may be controlled by the processor 270. The touch sensor 213a may be activated or deactivated under control of the processor 270.

The touch sensor 213a may be disposed to correspond to a pattern PT formed in the pattern part 811. There may be a plurality of touch sensors 213a. The plurality of touch sensors 213a may be disposed to respectively correspond to a plurality of patterns PT. For example, a first touch sensor may be disposed to correspond to a first pattern, and a second touch sensor may be disposed to correspond to a second pattern.

The touch sensor 213a may be disposed such that at least part thereof overlaps a pattern PT formed in the pattern part 811 in a vertical direction. For example, the touch sensor 213a may be disposed such that at least part thereof overlaps a pattern PT formed in the pattern part 811 in a direction of an optical path.

The touch sensor 213a may be transparent. For example, the touch sensor 213a may be formed of silver nano paste, conducting polymer (for example, PEDOT), or Indium-Thin Oxide film.

The touch sensor 213a may be disposed on a transparent flexible printed circuit board.

Other components of the input 210, except for the touch sensor 213a of the touch input unit 213, are the same as those of the input unit 210 described with reference to FIG. 7.

The internal camera 220 is the same as the internal camera 220 described with reference to FIG. 7.

The biometric sensing unit 230 is the same as the biometric sensing unit 230 described with reference to FIG. 7.

The memory 240 is electrically connected to the processor 270. The memory 240 may store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In some implementations, the memory 240 may be integrated into the processor 270, or may be an element of the processor 270.

The memory 240 may be disposed on a transparent flexible printed circuit board.

The interface unit 245 may exchange information, data, or a signal with a different device included in the vehicle 100. The interface unit 245 may transmit the received information, data, or a signal, which is generated or processed by the processor 270, to the processor 270. The interface unit 245 may receive information, data, or a signal from a different device included in the vehicle 100.

The interface unit 245 may receive door opening information or ignition ON information.

The interface unit 245 may be disposed on a transparent flexible printed circuit board.

The output unit 250 may include a display unit 251, a sound output unit 252, a haptic output unit 253, and a light emitting unit 254.

The light emitting unit 254 may generate light and output the light. To this end, the light emitting unit 254 may include at least one light source 254a.

The light source 254a may be disposed to correspond to a pattern formed in the pattern part 811. There may be a plurality of light sources 254a.

The light emitting unit 254 may include a plurality of light sources. The plurality of light sources may be disposed to respectively correspond to a plurality of patterns formed in the pattern part 811. For example, a first light source may be disposed to correspond to a first pattern, and a second light source may be disposed to correspond to a second pattern.

The plurality of light sources may be disposed in a plurality of separate regions, respectively.

A light source may include at least one light emitting device.

A light emitting device may include any one of various devices capable of converting electricity into light, but it is preferable that the light emitting device includes a Light Emitting Diode (LED).

The light emitting unit 254 may be controlled by the processor 270. The light emitting unit 254 may generate light and output the light under control of the processor 270.

The light emitting unit 254 may be disposed in any one of a vehicle dashboard, an inner surface of a door, an inner surface of a roof, a seat, a sun visor, an A-pillar, a B-pillar, and a C-pillar of the vehicle 100.

Other components of the output unit 250, except for the light emitting unit 254, may be the same as those of the light emitting unit 254 described with reference to FIG. 7.

The light emitting unit 254 may be disposed on a transparent flexible printed circuit board.

The processor 270 may control the overall operation of each unit of the user interface apparatus 200.

The processor 270 may control the light emitting unit 254 to generate light in response to an event.

The event may be a user's input received via the input unit 210. The event may be a signal generated using the internal camera 220 or the biometric sensing unit 230. The vent may be information, data, or a signal received from another device included in the vehicle via the interface unit 245.

If light is generated by the light emitting unit 254, the processor 270 may activate the touch sensor 213a.

When an event has not occurred, the processor 270 may control the touch sensor 213a to remain deactivated. While light is not generated by the light emitting unit 254, the processor 270 may control the touch sensor 213a to remain deactivated.

When an event has occurred, the processor 270 may control the touch sensor 213a to be activated. When light is generated by the light emitting unit 254, the processor 270 may control the touch sensor 213a to be activated.

The processor 270 may provide a signal for controlling a vehicle device corresponding to a touch input that is received via an activated touch sensor.

In some implementations, the vehicle device may indicate various devices included in a vehicle. For example, the vehicle device may be any one of a vehicle multimedia device, a vehicle air conditioner, a vehicle window device, a vehicle lamp, a trunk opening/closing device, a hood opening/closing device, a sunroof opening/closing device, a gas tank door opening/closing device, a sun visor folding control device, a door lock device, and a seat adjustment device. In response to a touch input received via an activated touch sensor, the processor 270 may provide a signal to control any one of the vehicle multimedia device, the vehicle air conditioner, the vehicle window device, the vehicle lamp, the trunk opening/closing device, the hood opening/closing device, the sunroof opening/closing device, the gas tank door opening/closing device, the sun visor folding control device, the door lock device, and the seat adjustment device.

Based on an event, the processor 270 may change a position of light output from the light emitting unit 254.

For example, when a first event has occurred, the processor 270 may control outputting of light from a first light source that is positioned in a first region. When a second event has occurred, the processor 270 may control outputting of light from a second light source that is positioned in a second region. The first and second regions may be regions inside a vehicle. The first and second light sources are included in the light emitting unit 254.

Based on an event, the processor 270 may adjust a color of light output from the light emitting unit 254.

For example, when the first event has occurred, the processor 270 may control the light emitting unit 254 to output light of a first color. In addition, when the second event has occurred, the processor 270 may control the light emitting unit 254 to output light of a second color.

When door opening information or ignition ON information is received via the interface unit 245, the processor 270 may control the light emitting unit 254 to generate light. At this point, the generated light may be in a form different from that of light used for activation of a touch sensor (for example, different color or different brightness).

For example, when a user opens a door to get in a vehicle, the processor 270 may control outputting of light in order to cause a user to recognize a location of the user interface apparatus 200.

For example, when a user turns on ignition of the vehicle, the processor 270 may control outputting of light in order to cause the user to recognize a location of the user interface apparatus 200.

In ordinary situations, the user interface apparatus 200 is seemingly integrated into a vehicle interior part (e.g., a synthetic resin material, a fabric material, a wood material, a leather material, and a metal material), and thus, a user may not be able to recognize a location of the user interface apparatus 200. When a vehicle door is opened or when the ignition is turned on, the processor 270 may control outputting of light to cause a user to recognize the location of the user interface apparatus 200.

When a predetermined period of time elapses after the door opening information or the ignition ON information is received, the processor 270 may control dimming of light that is generated by the light emitting unit 254.

In doing so, the processor 270 may enable a user to recognize the location of the user interface apparats 200, and then cause the user interface apparatus 200 to be seemingly integrated into the vehicle's interior.

The processor 270 may be disposed on a transparent flexible printed circuit board.

Under control of the processor 270, the power supply unit 290 may supply power required for the operation of each component. In particular, the power supply unit 290 may be supplied with power from a battery inside the vehicle.

The power supply unit 290 may be disposed on a transparent flexible printed circuit board.

Figure 8B:
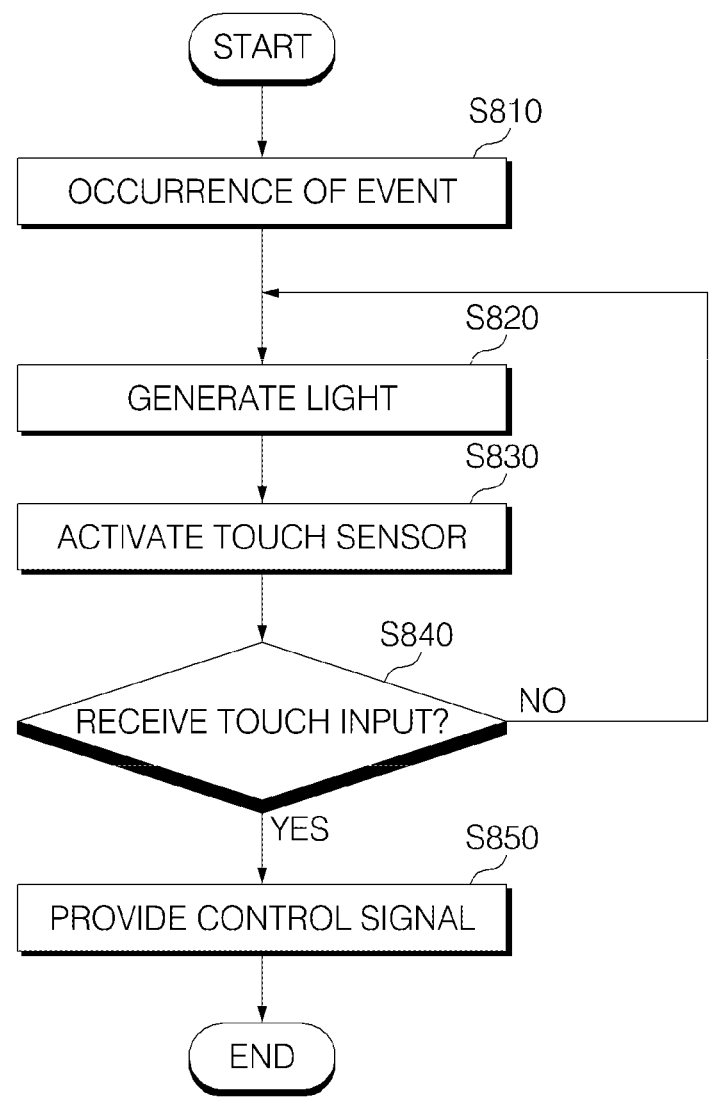
FIG. 8B is a flowchart illustrating an example of an operation of a user interface apparatus for a vehicle according to an implementation.

FIG. 8B is a flowchart for explanation of a user interface apparatus for vehicle according to an implementation.

Referring to FIG. 8B, the processor 270 may determine whether an event has occurred in S810.

Based on a user input received via the input unit 210, the processor 270 may determine whether an event has occurred.

For example, when a voice input is received via the voice input unit 211, the processor 270 may determine that an event has occurred.

For example, when a gesture input is received via the gesture input unit 212, the processor 270 may determine that an event has occurred.

For example, when a touch input is received via the touch input unit 213, the processor 270 may determine that an event has occurred.

For example, when a mechanic input is received via the mechanic input unit 214, the processor 270 may determine that an event has occurred.

Based on information acquired using the internal camera 220, the processor 270 may determine whether an event has occurred.

For example, based on occupant information acquired using the internal camera 220, the processor 270 may determine that an event has occurred. The occupant information may include information regarding a location of an occupant inside in a passenger compartment. Specifically, when information indicating an occupant getting into a driver seat is acquired using the internal camera 220, the processor 270 may determine whether an event has occurred.

Based on information acquired using the biometric sensing unit 230, the processor 270 may determine whether an event has occurred.

For example, based on occupant biometric information acquired using the biometric sensor 230, the processor 270 may determine whether an event has occurred. Specifically, when occupant biometric information acquired using the biometric sensing unit 230 matches information pre-stored in the memory 240, the processor 270 may determine that an event has occurred.

Based on information received via the interface unit 245, the processor 270 may determine that an event has occurred.

Based on vehicle information received via the interface unit 235, the processor 270 may determine that an event has occurred.

The vehicle information may include at least one of the following: vehicle location information, vehicle speed information, gear lever position information, door opening/closing information, safety belt status information, brake pedal position information, Idle Stop and Go (ISG) function on/off information, passenger information, driver's biometric information, seat position information, and audio volume control information.

For example, upon receiving information related to opening of a driver's seat door, the processor 270 may determine that an event has occurred.

For example, upon receiving information indicating a fastened status of a safety belt of a driver seat, the processor 270 may determine that an event has occurred.

For example, upon receiving information that indicates a fastened status of safety belts of all seats where passengers are located, the processor 270 may determine that an event has occurred.

For example, upon receiving brake pedal position information based on a pressed brake pedal, the processor 270 may determine that an event has occurred.

For example, upon receiving gear lever position information indicative of a park position P or a neutral position N, the processor 270 may determine that an event has occurred.

For example, upon receiving gear lever position information indicative of a drive position D or a reverse position R, the processor 270 may determine that an event has not occurred.

For example, upon a vehicle speed value other than zero, the processor 270 may determine that an event has not occurred.

For example, when an emergency situation happens with a vehicle speed value other than zero, the processor 270 may determine that an event has occurred.

For example, upon receiving information that indicates a state in which an engine is not being operated based on an Idle Stop and Go (ISG) function, the processor 270 may determine that an event has not occurred.

When a location of the vehicle corresponds to a pre-registered area, the processor 270 may determine that an event has occurred.

When an event has occurred, the processor 270 may control the light emitting unit 254 to generate light in S820.

Then, the processor 270 may control activating of the touch sensor 213a in S830.

If a touch is sensed when the touch sensor 213a is activated, the processor 270 may perform an operation corresponding to the touch.

If a touch is sensed when the touch sensor 213a is deactivated, the processor 270 may not perform an operation corresponding to the touch.

If a touch input is received when the touch sensor 213a is activated, the processor 270 may provide a control signal corresponding to the touch input to a vehicle device in S850.

The user interface apparatus 200 may be implemented as an ignition control apparatus 200e. In this case, the processor 270 may provide a control signal corresponding to a touch input so as to control any one function from among a plurality of control functions of an ignition device.

The user interface apparatus 200 may be implemented as a seat position control apparatus 200f. In this case, the processor 270 may provide a control signal corresponding to a touch input so as to control any one function among a plurality of control functions of a seat adjustment device.

The user interface apparatus 200 may be implemented as an audio volume control apparatus 200a. In this case, the processor 270 may provide a control signal corresponding to a touch input to control volume of a multimedia device.

FIG. 9 is a diagram for explanation of a location of a user interface apparatus for vehicle according to an implementation.

Referring to FIG. 9, the user interface apparatus 200 for vehicle may be disposed inside a vehicle. The user interface apparatus 200 may be disposed in any one of regions forming the passenger compartment.

For example, the user interface apparatus 200 may be disposed on at least one of the following: a region 801 of a vehicle dash board, a region 802 of an inner surface of a door, a region 803 of a console, a region of an inner surface of a roof, a region 804 of a seat, a region of a sun visor, a region of an A-pillar, a region of a B-pillar, and a region of a C-pillar of the vehicle.

The user interface device 200 may be seemingly integrated into the vehicle's interior.

For example, the user interface apparatus 200 may be formed integrally with a finishing material of the dash board 801, the inner surface of the door 802, the console 803, the inner surface of the roof, the seat 804, the sun visor, the A-pillar, the B-pillar, or the C-pillar (e.g., synthetic resin, fabric, wood, leather, and metal).

Specifically, a surface 817 included in the cover part 810 of the user interface apparatus 200 may be formed of the same material as the above finishing material.

As above, the user interface apparatus 200 is provided to be seemingly integrated into the vehicle's interior in order not to cause a sense of incompatibility. Such a user interface apparatus 200 may be referred to as a translucent touch garnish (TTG).

When an event has not occurred, the user interface apparatus 200 is seemingly integrated into the vehicle's interior, thereby causing a sense of incompatibility.

When an event has occurred, the user interface apparatus 200 may be activated to thereby receive a user's touch input via the touch sensor 213a and control a vehicle device in response to the touch input.

The event may be based on a user input received via the input unit 210, a signal generated by the internal camera 220 or the biometric sensing unit 230, or information, data, and signals received via the interface unit 245.

Figure 10A:
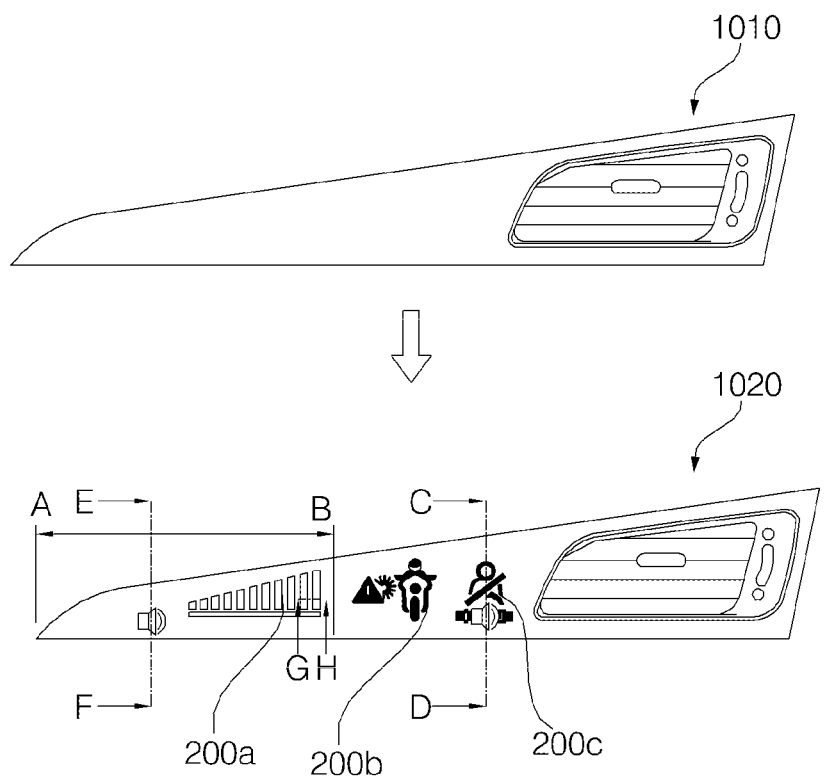
FIGS. 10A and 10B are diagrams illustrating examples of a user interface apparatus according to an implementation.
Figure 10B:
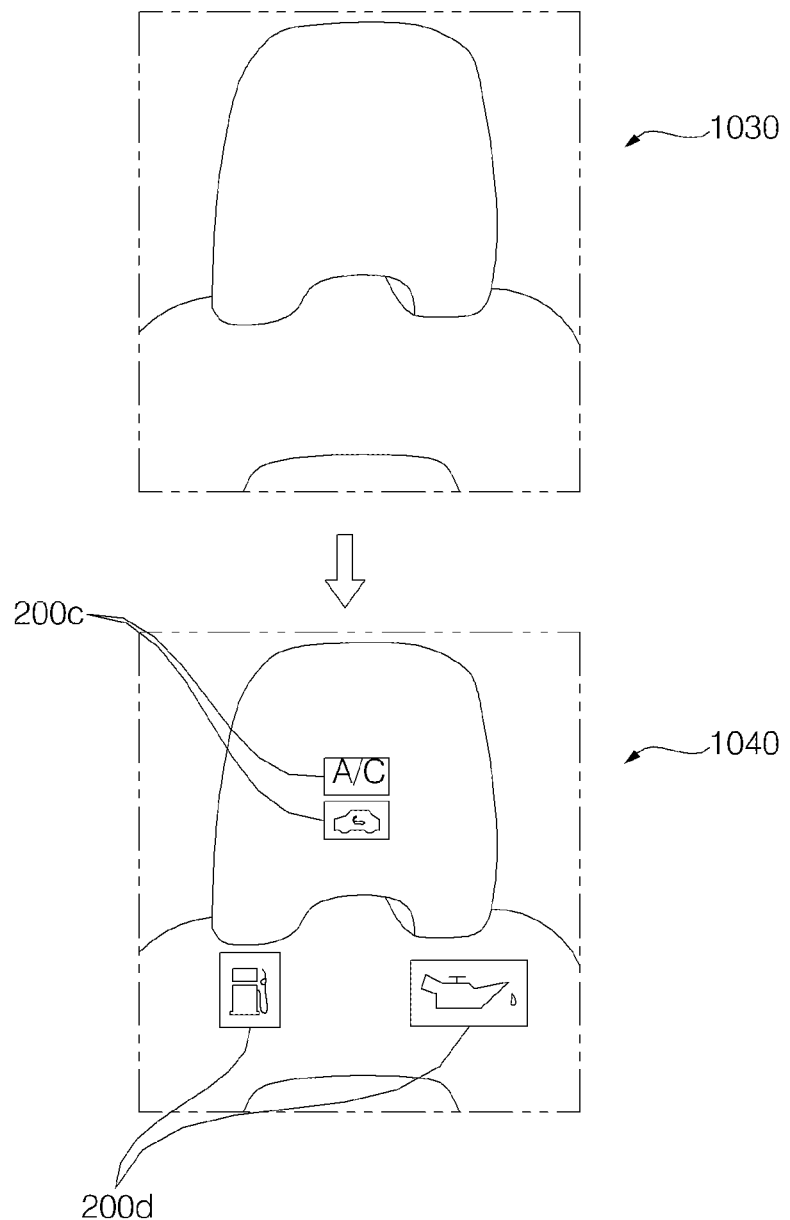

FIGS. 10A and 10B are diagrams illustrating examples of a user interface apparatus according to an implementation.

As illustrated in FIG. 10A, the user interface apparatus 200 may be disposed on a region of a dash board, a region of an instrument panel, or a region of a door trim.

The user interface apparatus 200 may be implemented as an audio volume control apparatus 200a.

When an event has not occurred, the audio volume control apparatus 200a may not be activated, as indicated by 1010.

When an event has occurred, the audio volume control apparatus 200a may be activated, as indicated by 1020. When the audio volume control apparatus 200a is activated, the processor 270 may control the light emitting unit 254 to output light to the outside. In this case, the processor 270 may receive a user's touch input via the touch sensor 213a.

In response to a user's touch input, the processor 270 may provide an audio volume control signal to a vehicle multimedia device.

In some implementations, the event may be a user input received via the input unit 210. For example, when at least one of a voice input, a gesture input, a touch input, and a mechanic input is received, the processor 270 may determine that an event has occurred. In particular, an event may be a touch input received via the touch sensor 213a. The touch input may be referred to as a trigger input.

The user interface apparatus 200 may be implemented as an object detection warning indicator 200b.

When an event has not occurred, the object detection warning indicator 200b is not activated, as indicated by 1010.

When an event has occurred, the object detection warning indicator 200b may be activated, as indicated by 1020. When the object detection warning indicator 200b is activated, the processor 270 may control the light emitting unit 254 to output light to the outside. In this case, the processor 270 may receive a user's touch input via the touch sensor unit 213*a*.

In some implementations, the event may be receiving of object detection information from an object detection apparatus 300. For example, when information on an object approaching to a vehicle 100 within a predetermined distance is received from the object detection apparatus 300, the processor 270 may determine that an event has occurred.

Such a user interface apparatus 200 may be implemented as a Blind Stop Detection (BSD) output apparatus.

The user interface apparatus 200 may be implemented as an unfastened seat belt warning indicator 200*c*.

When an event has not occurred, the unfastened seat belt warning indicator 200*c* is not activated, as indicated by 1010.

When an event has occurred, the unfastened seat belt warning indicator 200*c* may be activated, as indicated by 1020. When the unfastened seat belt warning indicator 200*c* is activated, the processor 270 may control the light emitting unit 254 to output light to the outside. In this case, the processor 270 may receive a user's touch input via the touch sensor 213*a*.

In some implementations, the event may be receiving of seat belt status information. For example, when information related to an unfastened status of a seat belt is received, the processor 270 may determine that an event has occurred.

As illustrated in FIG. 10B, the user interface apparatus 200 may be disposed in one region of a seat.

The user interface apparatus 200 may be implemented as an air conditioning control apparatus 200*c*.

When an event has not occurred, the air conditioning control apparatus 200*c* is not activated, as indicated by 1030.

When an event has occurred, the air conditioning control apparatus 200*c* may be activated, as indicated by 1040. When the air conditioning control apparatus 200*c* is activated, the processor 270 may control the light emitting unit 254 to output light to the outside. In this case, the processor 270 may receive a user's touch input via the touch sensor 213*a*.

In response to the user's touch input, the processor 270 may provide an air conditioning control signal to a vehicle air conditioner.

In some implementations, the event may be a user input received via the input unit 210. For example, when at least one of a voice input, a gesture input, a touch input, and a mechanic input is received, the processor 270 may determine that an event has occurred. In particular, the event may be a touch input received via the touch sensor 213*a*. The touch input may be referred to as a trigger input.

The user interface apparatus 200 may be implemented an On Board Diagnostics (OBD) information indicator 200*d*.

When an event has not occurred, the OBD information indicator 200*d* is not activated, as indicated by 1030.

When an event has occurred, the OBD information indicator 200*d* may be activated, as indicated by 1040. When the OBD information indicator 200*d* is activated, the processor 270 may control the light emitting unit 254 to output light to the outside. In this case, the processor 270 may receive a user's touch input via the touch sensor 213*a*.

In some implementations, the event may be receiving sensing information via the sensing unit 120. For example, when fuel information with a value equal to or smaller than a reference value is received or engine oil information with a value equal to or small than a reference value is received, the processor 270 may determine that an event has occurred.

Figure 11:
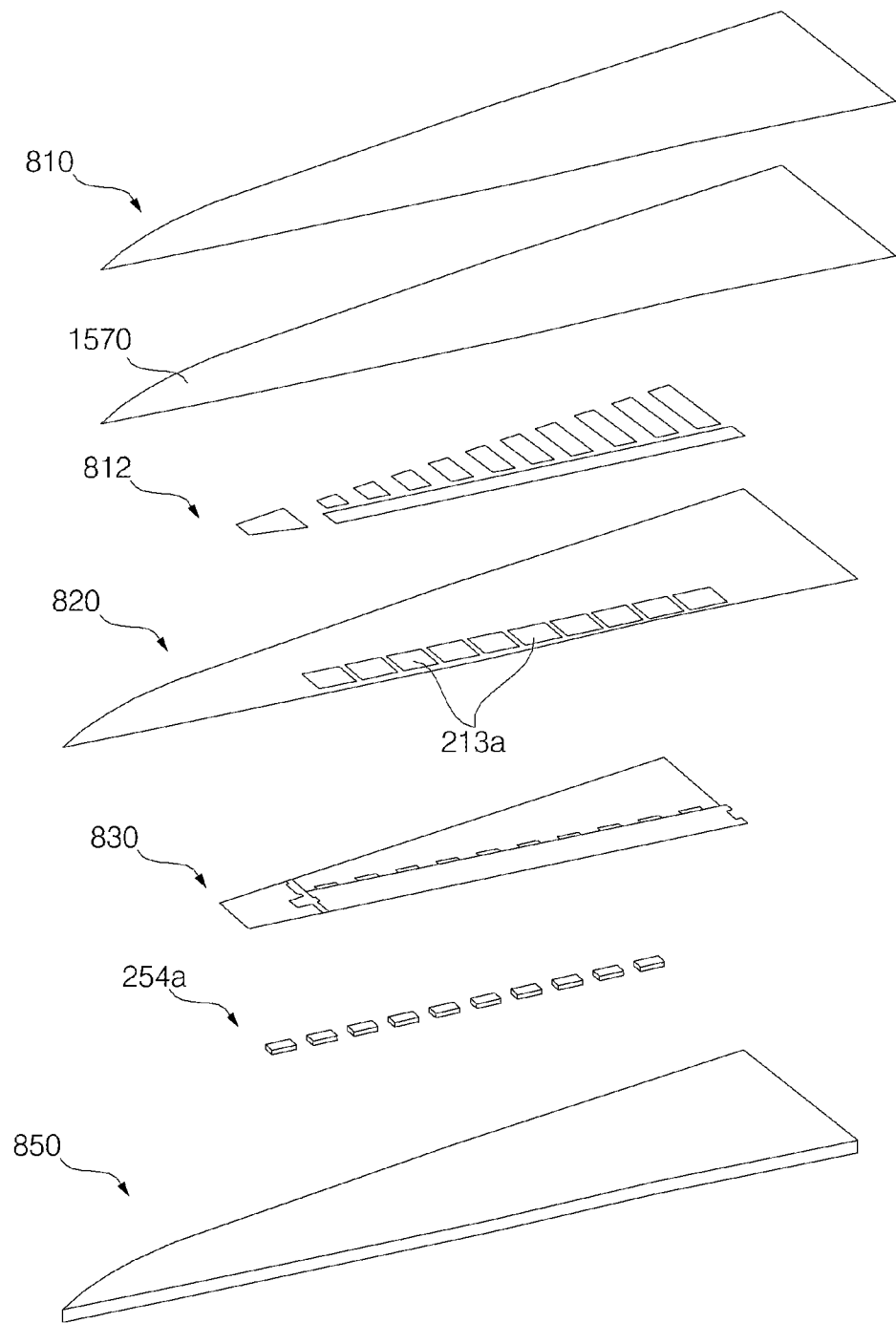
FIG. 11 is a diagram illustrating an example of an exploded perspective view of a user interface apparatus for a vehicle according to an implementation.

FIG. 11 is an exploded perspective view of a user interface apparatus for vehicle according to an implementation. FIG. 11 is an exemplary view cut away taken along line A-B of FIG. 10A.

Figure 12:
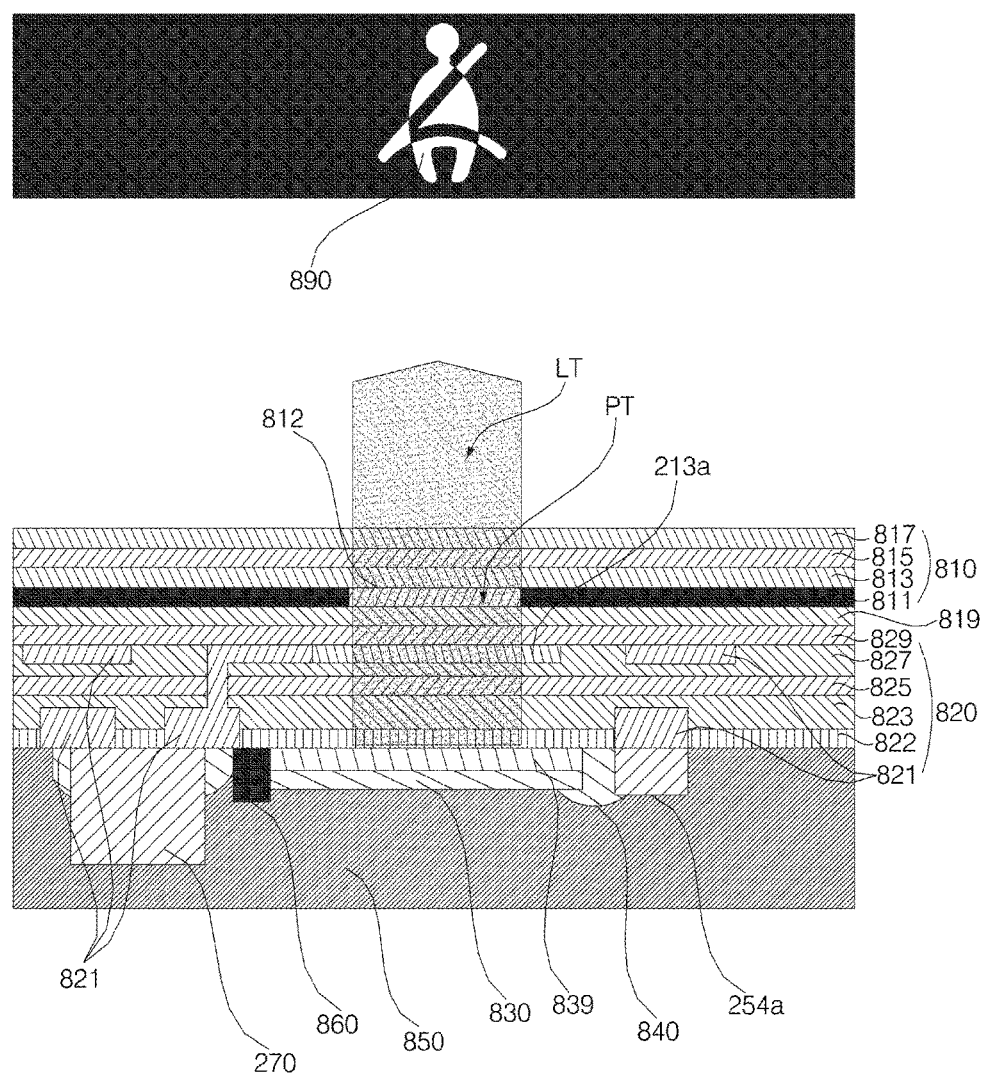
FIG. 12 is a diagram illustrating an example of a cross-sectional view of a user interface apparatus for a vehicle according to an implementation.

FIG. 12 is a cross-sectional view of a user interface apparatus for vehicle according to an implementation. FIG. 12 is an exemplary view cut away taken along line C-D of FIG. 10A.

FIG. 11 shows an example of a user interface apparatus for vehicle, which includes a plurality of light sources, a plurality of touch sensors, and a plurality of patterns. FIG. 12 shows an example of a user interface apparatus for vehicle, which includes a single light source, a single touch sensor, and a single pattern.

Referring to FIGS. 11 and 12, the user interface apparatus 200 will be described in terms of structure.

The user interface apparatus 200 may include a cover part 810, a circuit part 820, and a plastic portion 850.

The cover part 810 may cover the light emitting unit 254, the touch sensor 213*a*, and the processor 270. When light is generated by the light emitting unit 254, the cover part 810 may allow the light to pass therethrough into a passenger compartment and form a shape 890.

The cover part 810 may include the pattern part 811, a film part 813, and a first transparent film 815, and a surface 817.

The cover part 810 will be described later in more detail with reference to FIG. 17.

The circuit part 820 may include the light emitting unit 254, the touch sensor 213*a*, the processor 270, and a transparent flexible printed circuit board 821.

The circuit part 820 may further include a circuit board 821, a second transparent film 822, a first adhesive film 823, a third transparent film 827, a second adhesive film 837, and a fourth transparent film 825.

The light emitting unit 254, the touch sensor 213*a*, and the processor 270 may be disposed on the circuit board 821.

The circuit board 821 may be a transparent flexible printed circuit board.

The circuit board 821 may be formed by etching a copper foil. The circuit board 821 may be formed by silk screen printing with a silver paste.

The second transparent film 822 may control light transmissivity.

The second transparent film 822 may be formed of a transparent material, such as polyethylene terephalate (PET), polycarbonate (PC), polyimide (PI), polystyrene (PS), and polyacrylonitile (PAN).

The second transparent film 822 may be formed of a heat resistant material which has been heat annealed. Therefore, the second transparent film 822 may have heat resistant properties.

The first adhesive film 823 may be adherent to the second transparent film 822, the third transparent film 825, and a region of the circuit board 821.

With a circuit being mounted, the first adhesive film 823 may be formed of a low-temperature and low-pressure thermosetting adhesive which is able to be press-adherent. The first adhesive film 823 may be a thin walled adhesive film for minimizing thickness of the user interface apparatus 200. The first adhesive film 823 may be a transparent adhesive film through which light is able to pass.

The third transparent film 825 may control light transmissivity.

The third transparent film 825 may be formed of a transparent material, such as polyethylene terephalate (PET), polycarbonate (PC), polyimide (PI), polystyrene (PS), and polyacrylonitile (PAN).

The third transparent film 825 may be formed of a heat resistant material which has been heat annealed. Therefore, the third transparent film 825 may have heat resistant properties.

The second adhesive film 827 may be adherent to the third transparent film 825, the fourth transparent film 829, a region of the circuit board 821, and the touch sensor 213a.

With a circuit being mounted, the second adhesive film 827 may be formed of a low-temperature and low-pressure thermosetting adhesive which is able to be press-adherent. The second adhesive film 827 may be a thin walled adhesive film in an attempt to minimize thickness of the user interface apparatus 200. The second adhesive film 827 may be a transparent adhesive film through which light is able to pass.

The fourth transparent film 829 may control light transmissivity.

The fourth transparent film 829 may be formed of a transparent material, such as polyethylene terephalate (PET), polycarbonate (PC), polyimide (PI), polystyrene (PS), and polyacrylonitile (PAN).

The fourth transparent film 829 may be formed of a heat resistant material which has been heat annealed. Therefore, the fourth transparent film 829 may have heat resistant properties.

The cover part 810 and the transparent flexible printed circuit part 820 may be adherent to each other by a third adhesive film 819.

With a circuit being mounted, the third adhesive film 819 may be formed of a low-temperature and low-pressure thermosetting adhesive which is able to be press-adherent. The third adhesive film 819 may be a thin walled adhesive film in an attempt to minimize thickness of the user interface apparatus 200. The third adhesive film 819 may be a transparent adhesive film through which light is able to pass.

The light source 254a included in the light emitting unit 254 may be disposed on the circuit part 820.

The light emitting unit 254 may be mounted on the circuit part 820 using an optical soldering technique. For example, the light emitting unit 254 may be mounted on the circuit board 821 using an optical soldering technique.

The optical soldering technique is a technique by which two or more items are jointed together by melting a solder bond material into the joint due to heat from absorption of light energy.

The touch sensor 213a may be disposed to correspond to a pattern PT formed in the pattern part 811. For example, the touch sensor 213a may be disposed such that at least part thereof overlap the pattern PT in a vertical direction. For example, the touch sensor 213a may be disposed such that at least part thereof overlap with the pattern PT in a direction of an optical path.

The touch sensor 213a may be disposed on the circuit board 821.

The processor 270 may be disposed on the circuit board 821.

When a first touch is sensed using the touch sensor 213a, the processor 270 may control the light emitting unit 254 to generate light in response to the first touch. Then, when a second touch is sensed using the touch sensor 213a, the processor 270 may provide a signal for controlling a vehicle device in response to the second touch. The first touch may be a trigger input.

The plastic portion 850 may support reflection of light generated by the light emitting unit 254.

The plastic portion 850 may be injection resin, such as polycarbonate (PC), polycarbonate acrylate butadiene styrene (PC/ABS), acrylate butadiene styrene (ABS), and polyamide (PA).

In some implementations, the plastic portion 850 may be injection-bonded to the circuit part 820 to which the film part 813 is attached.

The plastic portion 850 may be injection molded while the cover part 810 and the circuit part 820 are inserted.

The plastic portion 850 may be an injected color resin, and may shield and reflect light. To this end, the plastic portion 850 may include an additive (for example, titanium dioxide(TiO2)) which supports reflection of light.

The user interface apparatus 200 may further include a light guide film (LGF) 830, an optical clear film (OCR) 840, a color film 812, a plastic portion 850, and a light shield structure 860.

The light guide film 830 may transmit light, generated by the light emitting unit 254, to the cover part 810.

In some implementations, the light guide film 830 may uniformly transmit light, generated by the light emitting unit 254, to the cover part 810. For example, the light guide film 830 may transmit light uniformly throughout the light guide film 830, thus uniformly illuminating the shape on the cover part 810.

The light guide film 830 may utilize various types of technologies to uniformly transmit light to the cover part 810. For example, the light guide film 830 may be formed of polycarbonate (PC), polymethyl methacrylate (PMMA), acrylate butadiene styrene (ABS), etc.

The optical clear film 840 may guide light, generated by the light emitting unit 254, to the light guide film 830.

The optical clear film 840 may be formed of a material, such as urethane, acryl, and silicon.

The color film 812 may change a wavelength of light generated by the light emitting unit 254. The color film 812 may change a color of the light generated by the light emitting unit 254. For example, if white light is output from the light emitting unit 254, the light may be changed to red, green, blue, or a combination thereof when the light is passing through the color film 812.

The color film 812 may be disposed to correspond to a pattern formed in the pattern part 811.

The light shield structure 860 may shield light travelling. The light shield structure 860 may shield not just light guided to the cover part 810 through the light guide film 830, but light travelling in a different direction.

Figure 13:
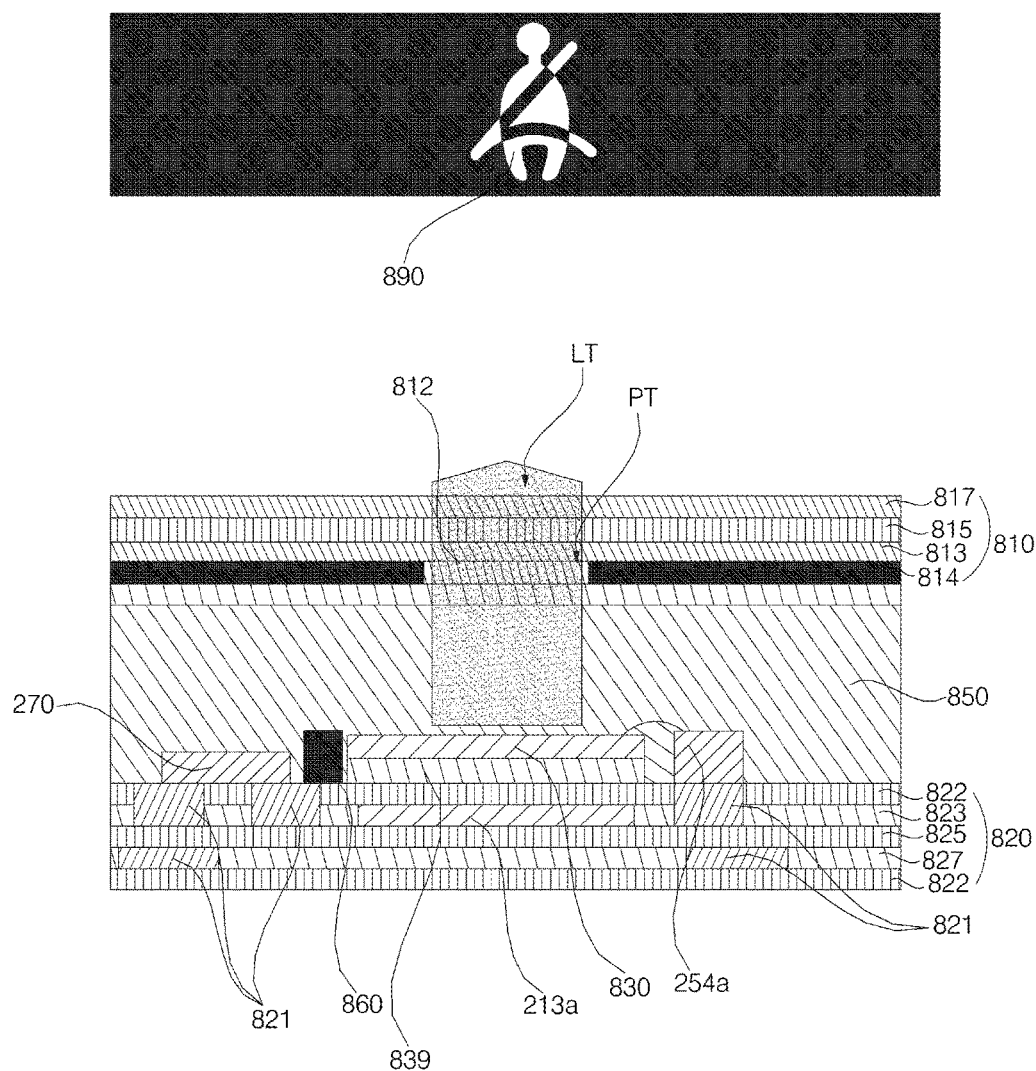
FIG. 13 is a diagram illustrating an example of a cross-sectional view of a user interface apparatus for a vehicle according to an implementation.

FIG. 13 is a cross-sectional view of a user interface apparatus for vehicle according to an implementation. FIG. 13 is another exemplary view cut away taken along lien C-D of FIG. 10A.

The user interface apparatus shown in FIG. 13 has the same configurations as those of the user interface apparatus shown in FIG. 12. However, the components of the user interface apparatus in FIG. 13 are arranged in the order different from how components of the user interface apparatus in FIG. 12 are arranged.

The user interface apparatus shown in FIG. 12 may be configured such that a cover part 810, a transparent flexible printed circuit board 820, and a plastic portion 850 are arranged in order named. For example, the user interface apparatus shown in FIG. 12 may be configured such that the plastic portion 850 is disposed on the transparent flexible printed circuit board 820 which is disposed on the cover part 810.

In some implementations, the user interface apparatus shown in FIG. 13 may be configured such that the cover part 810, the plastic portion 850, and the transparent flexible printed circuit board 820 are arranged in order named. For example, the user interface apparatus shown in FIG. 13 may be configured such that the transparent flexible printed circuit board 820 is disposed on the plastic portion 850 which is disposed on the cover part 810.

Except for the order of components arranged, other description about the user interface apparatus shown in FIG. 12 can be applied to the user interface apparatus shown in FIG. 13.

Figure 14:
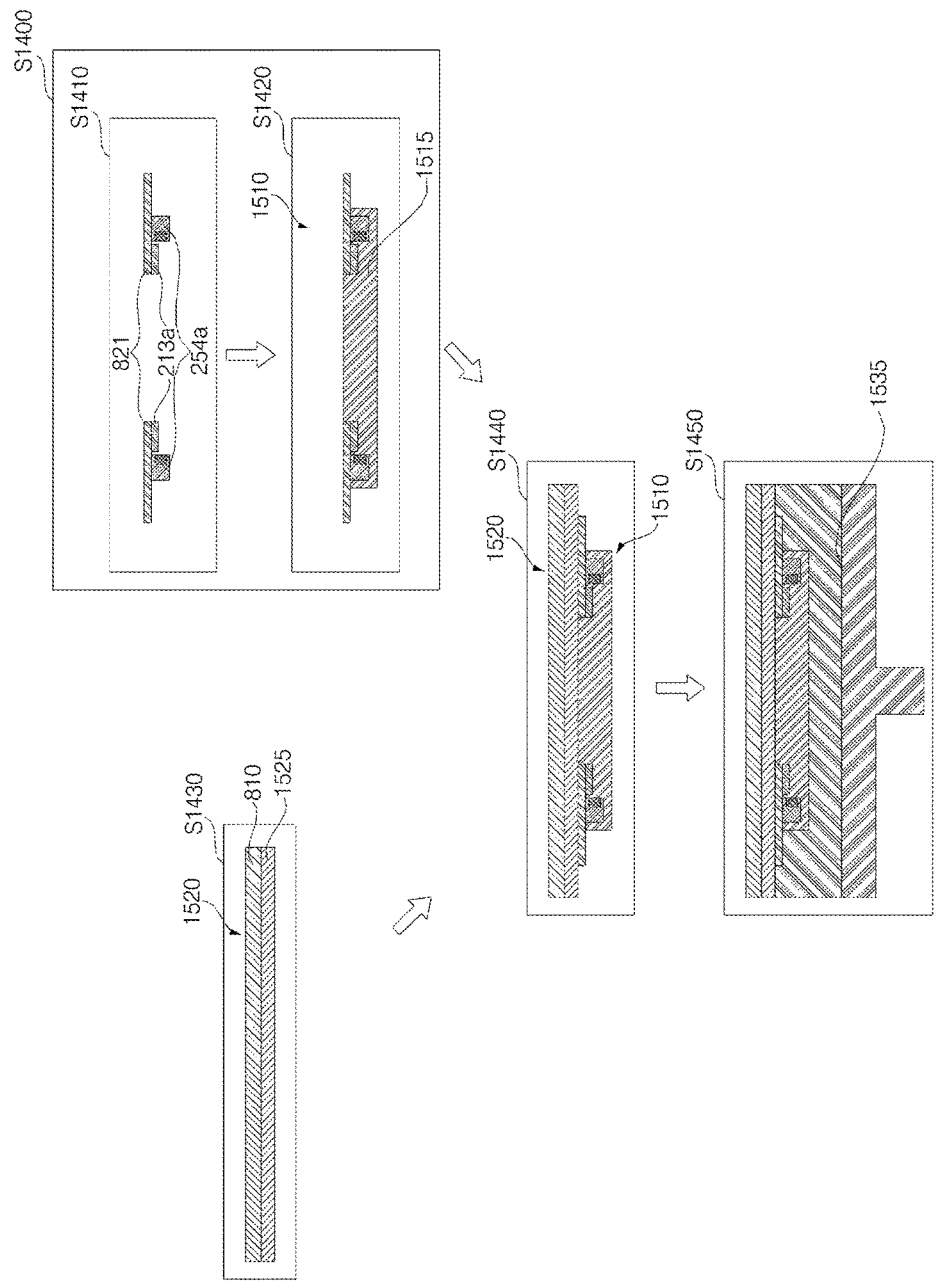
FIG. 14 is a diagram illustrating an example of manufacturing a user interface apparatus for a vehicle according to an implementation.

FIG. 14 is a diagram for explanation of a method of manufacturing a user interface apparatus for a vehicle according to an implementation. Although FIG. 14 describes a particular method of manufacturing that is based on insert-injecting, implementations are not limited thereto and the circuit part body and the cover part body may be formed by other suitable manufacturing techniques.

Referring to FIG. 14, a method of manufacturing the user interface apparatus 200 may include: manufacturing a circuit part injection-molded body in S1400; manufacturing a cover part injection-molded body in S1430; coupling in S1440; and injecting plastic in S1450.

Step S1400 may include: producing the circuit part 820 in S1410; and insert-injecting the circuit part 820 in S1420.

Step S1410 is a step of mounting the light emitting unit 254 including at least one light source, at least one touch sensor 213a, and the processor 821 on a circuit board 821.

For example, the circuit board 821 may be a transparent flexible printed circuit board.

For example, the circuit board 821 may be a circuit board of FR4.

For example, the circuit board 821 may be a circuit board of polyimide, polyethylene terephthalate (PET), or polycarbonate (PC).

For example, the circuit board 821 may have a thickness of 0.5 t or less.

For example, the circuit board 821 may include a location hole by which the circuit board 821 is located to correspond to a pattern.

For example, the light source may be an LED.

For example, the touch sensor 213a may be formed of an alloy of silver (Ag), paste, and copper (Cu).

In some implementations, as described above with reference to FIGS. 11 and 12, step S1410 may further include attaching at least one transparent film and at least one adhesive film individually or in combination.

In some implementations, in step S1410, the interface unit 245, the memory 240, and the power supply unit 290, individually or in combination, may be further mounted on the circuit board 821.

Step S1420 is a step of manufacturing the circuit part injection-molded body 1510 in an insert injection process in which first resin melt 1515 is injected when the circuit part 820 produced in S1410 is inserted into a first mold.

The first resin melt 1515 may be polyethylene terephalate (PET), poly carbonate (PC), poly imide (PI), polystyrene (PS), polyacrylonitile (PAN), etc.

In step S1420, the first resin melt 1515 may be injected to surround the light emitting unit 254. The first resin melt 1515 may be injected when the light emitting unit 254 is spaced apart from the first mold, so that the surroundings of the light emitting unit 254 may be filled up with the first resin melt 1515. In this case, it is possible to prevent any foreign substance from flowing into the surroundings of the light emitting unit 254 and to increase lighting efficiency.

Step S1430 is a step of manufacturing the cover part injection-molded body 1520 in an insert injection process in which second resin melt 1525 is injected when the cover part 810 is inserted into a second mold.

The second resin melt 1525 may be polyethylene terephalate (PET), poly carbonate (PC), polystyrene (PS), acrylate butadiene styrene (ABS), etc.

For example, in step S1430, the edge of the cover part 810 may be formed to protrude toward the plastic portion 850. In some implementations, the cover part 810 may be in the shape of basket, and the second resin melt 1525 may be injected into the basket. The cover part 810 may be formed to surround a buffer member that is formed by the second resin melt. In this case, it is possible to prevent light, generated by the light emitting unit 254, from leaking through a lateral side along a buffer member formed by the second resin melt 1525.

Step S1440 is a step of coupling the circuit part injection-molded body 1510 and the cover injection-molded body 1520. The circuit part injection-molded body 1510 may be coupled to the cover injection-molded body 1520. The cover injection-molded body 1520 may be coupled to the circuit part injection-molded body 1510.

For example, in step S1440, the circuit part injection-molded body 1510 and the cover injection-molded body 1520 are bonded to each other using Optical Clear Adhesive (OCA), Optical Clear Resin (OCR), or a double-sided tape.

In some implementations, step S1430 may be replaced by a step of forming a cover sheet. In the method of manufacturing the user interface apparatus 200, the cover injection-molded body may be replaced by a cover sheet.

The cover sheet may be made through thermo-molding or vacuum-molding of a material, such as polyethylene terephalate (PET), poly carbonate (PC), polystyrene (PS), acrylate butadiene styrene (ABS), on the cover part 810.

The step S1450 may be a step of performing an insert injection process in which a third resin melt 1535 is injected when the circuit part injection-molded body 1510 and the cover injection-molded body 1520 are inserted into a third mold while being bonded to each other.

That is, the plastic portion 850 may be formed in an insert injection process in which the third resin melt 1535 is injected when the circuit part injection-molded body 1510 and the cover injection-molded body 1520 are inserted into the third mold.

The third resin melt 1535 may be poly carbonate (PC), poly carbonate acrylate butadiene styrene (PC/ABS), acrylate butadiene styrene (ABS), polyamide (PA), etc.

The third resin melt 1535 may include a light reflective component (for example, TiO2). Due to the light reflective component, the plastic portion 850 may support reflection of light generated by the light emitting unit 254. As a result, lighting efficiency may increase.

Although particular examples of manufacturing the user interface apparatus have been described above, the present disclosure is not necessarily limited to such techniques. In general, the circuit part injection-molded body 1510, the cover injection-molded body 1520, and the third mold, as well as other components of the user interface apparatus, may be manufactured by other techniques that provide the resulting structures described in the figures.

FIGS. 15A to 15D are cross-sectional views of a user interface apparatus for vehicle according to an implementation. FIGS. 15A to 15D are exemplary views cut away taken along line E-F of FIG. 10A.

Description of the user interface apparatus 200 with reference to FIGS. 1 to 14 may be applied to the user interface apparatus 200 described with reference to FIGS. 15A to 15D.

With reference to FIGS. 15A to 15D, the user interface apparatus 200 will be described mainly about differences from the above description.

Figure 15A:
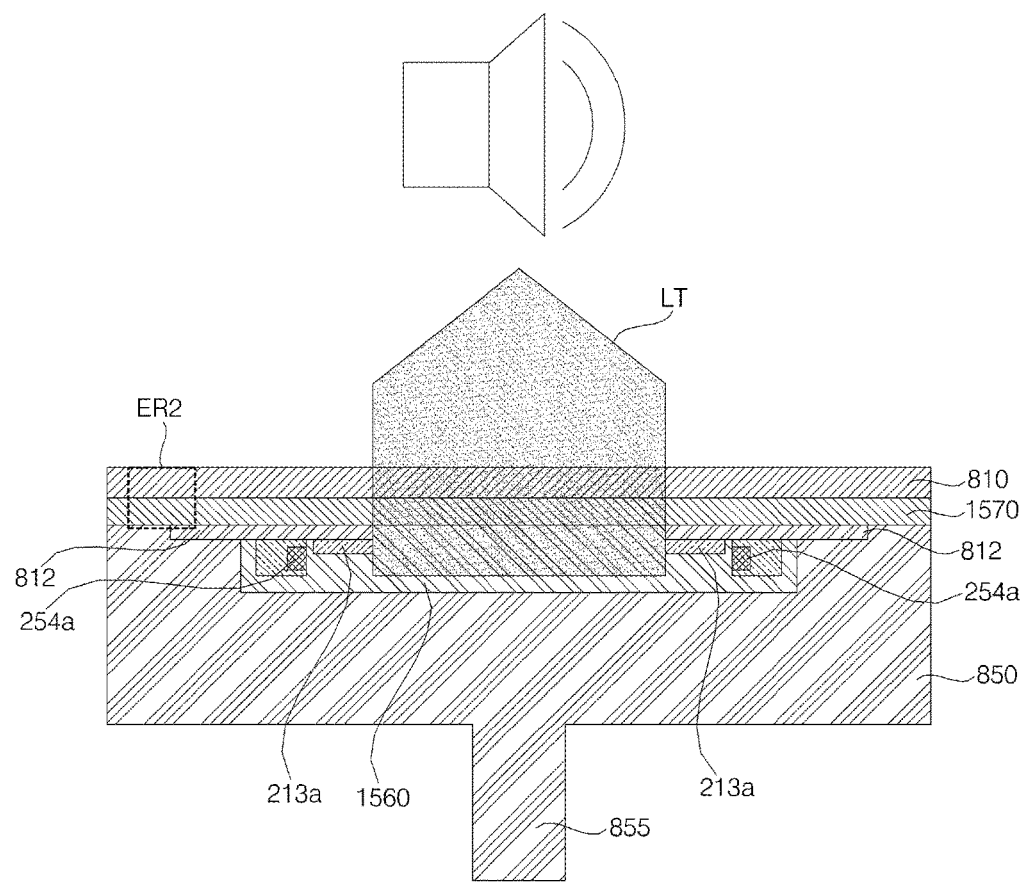
FIGS. 15A to 15D are diagrams illustrating examples of cross-sectional views of a user interface apparatus for a vehicle according to an implementation.

Referring to FIG. 15A, the user interface apparatus 200 may include a circuit part injection-molded body 1510 (see FIG. 14), and a cover injection-molded body 1520 (see FIG. 14).

The circuit part injection-molded body 1510 may be formed by the method described in FIG. 14.

The cover injection-molded body 1520 may be formed by the method described in FIG. 14.

The user interface apparatus 200 may further include a light diffusion member 1560, a buffer member 1570, and a plastic portion 850 individually or in combination.

The light diffusion member 1560 may be formed between the circuit board 820 and the plastic portion 850.

In some implementations, the light diffusion member 1560 may be formed by injecting the first resin melt 1515 (see, e.g., FIGS. 14 and 15A to 15C).

The light diffusion member 1560 may be transparent or semi-transparent. For example, the light diffusion member 1560 may be formed of a transparent material.

The light diffusion member 1560 may be configured to transmit light that is generated by the light emitting unit 254 to the cover part 810.

In some implementations, the light diffusion member 1560 may be formed substantially around the light emitting unit 254. For example, the light diffusion member 1560 may be formed to completely, or substantially, surround the light emitting unit 254 so as to transmit the light generated by the light emitting unit 254 to the cover part 810.

The light diffusion member 1560 may be formed by injecting the first resin melt 1515 when the light emitting unit 254 is spaced apart from the first mold. In this case, the light diffusion member 1560 is formed to surround the light emitting unit 254, and therefore, it is possible to prevent any foreign substance from flowing toward the surroundings of the light emitting unit 254 and to improve lighting efficiency.

The buffer member 1570 may be formed between the cover part 810 and the circuit part 820.

Figure 15B:
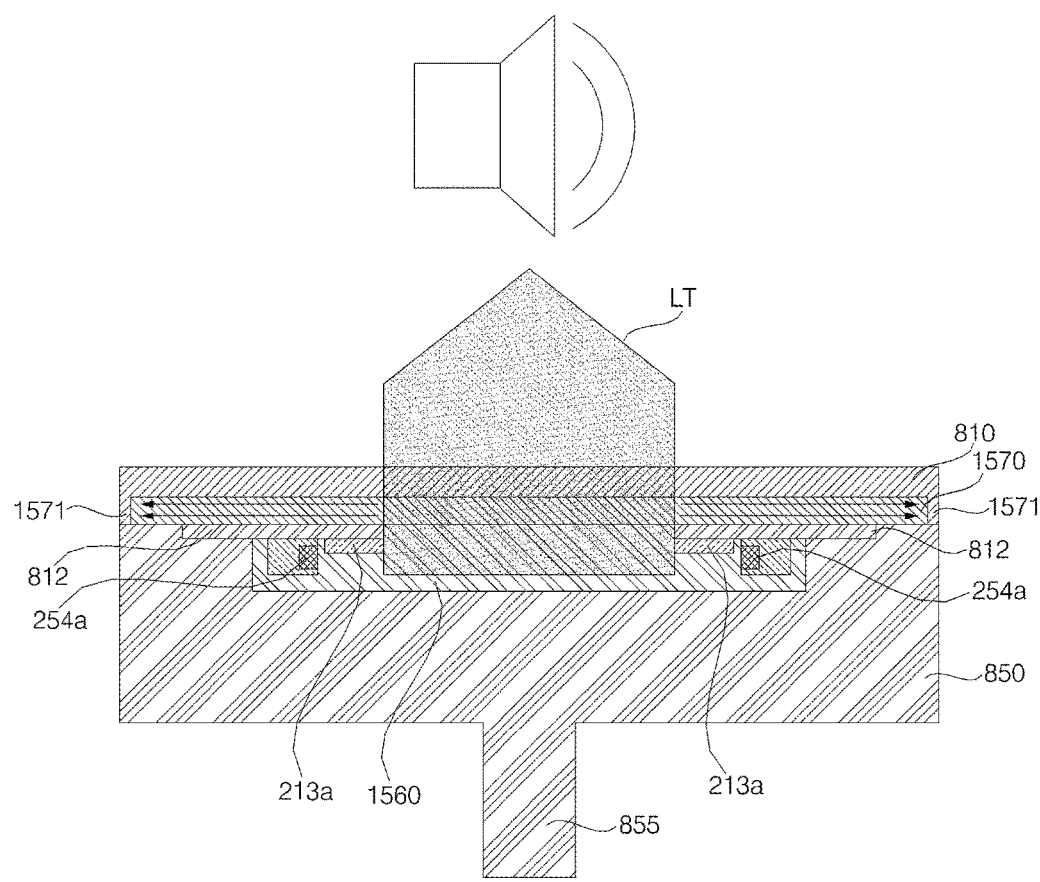
Figure 15C:
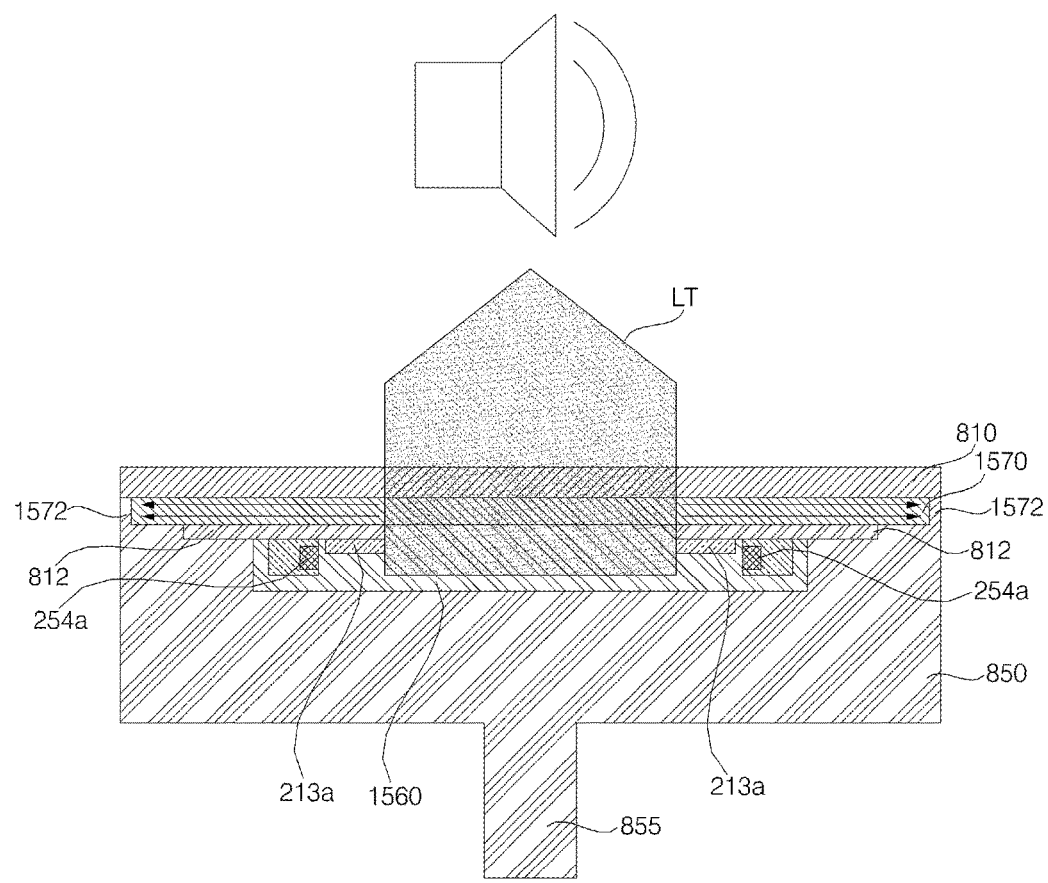

In some implementations, the buffer member 1570 may be formed by injecting the second melt 1525 (see, e.g., FIGS. 15A to 15C).

The buffer member 1570 may be formed to be transparent or semi-transparent. As an example, the buffer member 1570 may be formed of a transparent material.

In some implementations, the buffer member 1570 may be configured to alleviate a protrusion caused by the circuit part 820.

For example, in scenarios where many devices are mounted on the circuit board 821, the surface of the circuit part 820 may be uneven. In such scenarios, if the cover part 810 is coupled to the circuit part 820, this may result in an uneven surface of the cover part 810.

Implementations disclosed herein address this challenge by using the buffer member 1570 which is configured to alleviate the protrusion caused by the circuit part 820.

The cover part 810 may be formed to surround the edge of the buffer member 1570.

The plastic portion 850 may be disposed below the cover part 810 and the circuit part 820.

The plastic portion 850 may be formed through an insert injection process in which the third resin melt 1535 (see FIG. 14) is injected when the circuit injection-molded body 1510 and the cover injection-molded body 1520 are inserted.

The plastic portion 850 may support reflection of light generated by the light emitting unit 254. To this end, the plastic portion 850 may include an additive (for example, TiO2) that supports reflection of light.

In some implementations the plastic portion 850 may include a coupling assembly 855 for coupling with a vehicle component.

For example, via the coupling assembly 855, the user interface apparatus 200 may be coupled to at least one of a vehicle dashboard, an inner surface of a door, a console, an inner surface of a roof, a seat, a sun visor, an A-pillar, a B-pillar, and a C-pillar of the vehicle 100.

In some implementations, the coupling assembly 855 may be formed protruding or concave toward a vehicle component.

FIG. 15B is an exemplary view for explanation of characteristics of a cover according to an implementation.

In some implementations, the cover part 810 is formed to surround the edge of the buffer member 1570. In such implementations where the cover part 810 is formed to surround the edge of the buffer member 1570, it is possible to block light from leaking through a lateral side via the buffer member 1570.

For example, the cover part 810 may include a blocking portion 1571 disposed to surround the edge of the buffer member 1570. The blocking portion 1571 may be elongated from the edge of the cover part 810 toward the plastic portion 850. The blocking portion 1571 may block light from leaking through a lateral side via the buffer member 1570.

FIG. 15C is an exemplary view for explanation of characteristics of a plastic according to an implementation.

In some implementations, the plastic portion 850 may be formed to surround the edge of the buffer member 1570. In such implementations where the plastic portion 850 is formed to surround the edge of the buffer member 1570, it is possible to block light from leaking through a lateral side via the buffer member 1570.

For example, the plastic portion 850 may include a blocking portion 1572 disposed to surround the edge of the buffer member 1570. The blocking portion 1572 may be elongated from the edge of the plastic portion 850 toward the cover part 810. The blocking portion 1572 may block light from leaking through a lateral side via the buffer member 1570.

Figure 15D:
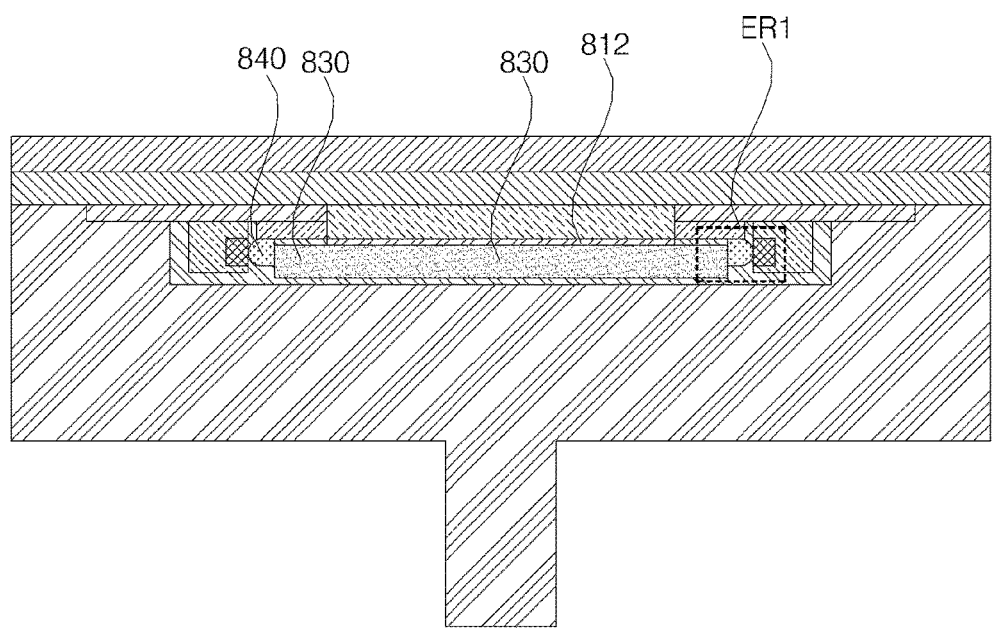

FIG. 15D is a diagram for explanation of a light guide film and an optical clear film according to an implementation.

Referring to FIG. 15D, the user interface apparatus 200 may further include a light guide film 830, an optical clear film 840, and a color film 812.

The light guide film 830 may transmit light, generated by the light emitting unit 254, to the cover part 810.

In some implementations, the light guide film 830 may uniformly transmit light, generated by the light emitting unit 254, to the cover part 810. For example, the light guide film 830 may transmit light uniformly throughout the light guide film 830, thus uniformly illuminating the shape on the cover part 810.

The light guide film 830 may use various types of technologies to uniformly transmit light to the cover part 810. For example, the light guide film 830 may be formed of poly carbonate (PC), polymethyl methacrylate (PMMA), acrylate butadiene styrene (ABS), etc.

Figure 16:
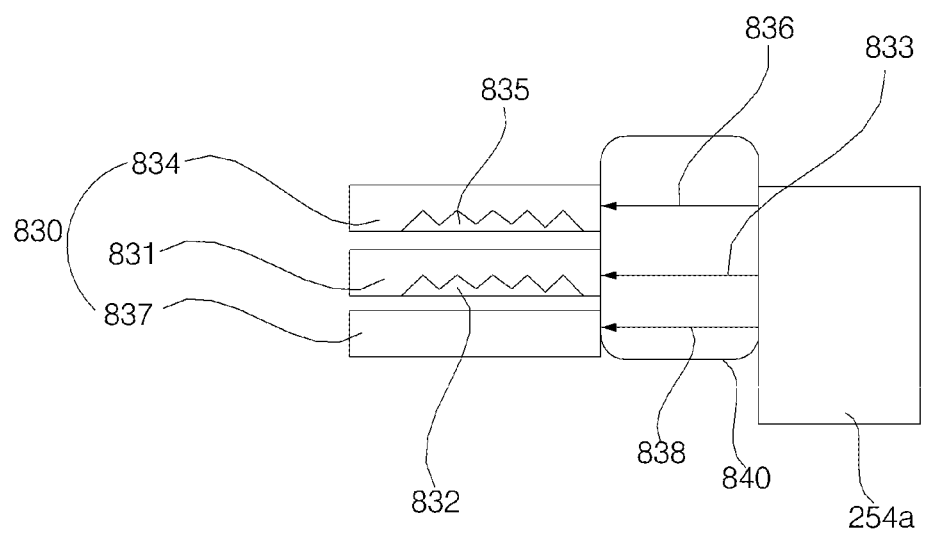
FIG. 16 is a diagram illustrating an example of an enlarged view of a region ER1 shown in FIG. 15D.

FIG. 16 is an enlarged view of an example of a region ER1 shown in FIG. 15D.

Referring to FIG. 16, the light guide film 830 may include a first light guide film 831, a second light guide film 834, and a third light guide film 837.

The first light guide film 831 may be formed on the second light guide film 834. The first light guide film 831 may include a first etching portion 832.

One side of the first light guide film 831 may come into contact with the second light guide film 834, and the other side of the first light guide film 831 may come into contact with the third light guide film 834.

The first etching portion 832 may induce scattering of light, which is generated by the light emitting source 254*a* and passes through the optical clear film 840. Due to the scattering, light output to the outside through a pattern PT has various colors, not a single color. Accordingly, it is possible to allow a user to easily recognize a shape 890 defined by the pattern PT, and draw the user's attention.

The first etching portion 832 may be formed to correspond to a pattern formed in the pattern part 811. Alternatively, the first etching portion 832 may be formed to correspond to the shape 890 defined by the shape PT. For example, the first etching portion 832 may be formed in shape and size similar to those of the pattern PT.

The first etching portion 832 may be formed on a surface of the first light guide film 831, the surface which comes into contact with the third light guide film 837.

An optical path 833 along which light comes into the first light guide film 831 is different from an optical path 836 along which light comes into the second light guide film 834. In addition, the optical path 833 along which light comes into the first light guide film 831 may be different from an optical path 838 along which light comes into the third light guide film 837.

The second light guide film 834 may be disposed between the first light guide film 831 and the cover part 810. The second light guide film 834 may include a second etching portion 835.

One side of the second light guide film 834 may come into contact with a fourth adhesive film 839, and the other side of the second light guide film 834 may come into contact with the first light guide film 831.

The second etching portion 835 may induce scattering of light, which is generated by the light source 254*a* and passes through the optical clear film 840. Due to the scattering, light output to the outside through a pattern PT may have various colors, not a single color. Accordingly, it is possible to allow a user to easily recognize the shape 890 defined by the pattern PT, and draw the user's attention.

The second etching portion 835 may be formed to correspond to a pattern PT formed in the pattern part 811. Alternatively, the second etching portion 835 may be formed to correspond to the shape 890 defined by the pattern PT. For example, the second etching portion 835 may be in shape and size similar to those of the pattern PT.

The second etching portion 835 may be formed on a surface of the second light guide film 834, the surface which comes into contact with the first light guide film 831.

The optical path 836 along which light comes into the second light guide film 834 may be different from the optical path 833 along which light comes into the first light guide film 831. The optical path 836 along which light comes into the second light guide film 834 may be different from the optical path 838 along which light comes into the third light guide film 837.

The third light guide film 837 may be formed on the first light guide film 831.

One side of the third light guide film 837 may come into contact with the first light guide film 831, and the other side of the third light guide film 837 may come into contact with the plastic portion 850.

The optical path 838 along which light comes into the third light guide film 837 is different from the optical path 833 along which light comes into the first light guide film 831. The optical path 838 along which light comes into the third light guide film 837 is different from the optical path 836 along which light comes into the second light guide film 834.

Referring to FIG. 15D, the optical clear film 840 may guide light, generated by the light emitting unit 254, to the light guide film 830.

The light clear film 840 may be formed of a material, such as urethane, acryl, and silicon.

The color film 812 may change a wavelength of light generated by the light emitting unit 254. The color film 812 may change a color of light output from the light emitting unit 254. For example, if white light is output from the light emitting unit 254, the light may be changed to red, green, blue, or a combination thereof when passing through the color film 812.

The color film 812 may be disposed to correspond to a pattern PT formed in the pattern part 811.

Figure 17:
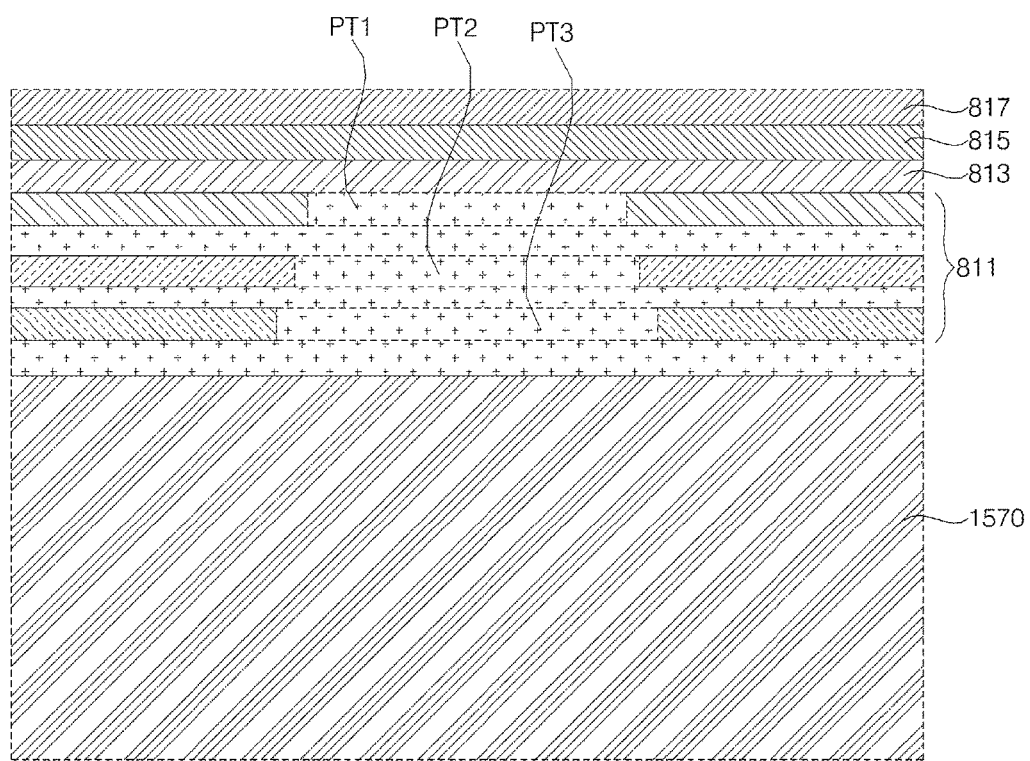
FIG. 17 is a diagram illustrating an example of an enlarged view of a region ER2 shown in FIG. 15A.

FIG. 17 is an enlarged view of a region ER2 shown in FIG. 15A.

Referring to FIG. 17, the cover part 810 may include a pattern part 811, a film part 813, a first transparent film 815, and a surface 817.

The pattern part 811 may be disposed between the film part 813 and a buffer member 1570.

The pattern part 811 may include a pattern PT corresponding to a shape 890. The pattern part 811 may allow light LT to pass through the pattern PT.

The pattern part 811 may be divided into a region in which a pattern PT is formed, and a region in which the pattern PT is not formed.

In the region in which the pattern PT is formed, the pattern part 811 may allow light LT to pass through the pattern PT to the outside. In the region in which the pattern PT is not formed, the pattern part 811 may shield the light LT.

The pattern part 811 may be printed using light-shield ink.

In some implementations, a pattern PT formed in the pattern part 811 may be referred to as a pictogram.

The pattern part 811 may include a pattern PT formed using a printing technique.

In some implementations, a plurality of patterns PT may be printed. For example, a second pattern PT2 may be further printed in addition to a first pattern PT1 which is already printed. In this case, the first pattern PT1 and the second patterns PT2 may be similar in shape, but different in size. The second pattern PT2 may be larger than the first pattern PT1. As the multiple patterns PT are printed, blurring light may be induced in a shape formed by the patterns PT.

In some implementations, a third pattern PT3 may be further printed. The third pattern PT3 may be have a shape similar to that of the first pattern PT1 and the second pattern PT2. The third pattern PT3 may be larger than the second pattern PT2.

A plurality of patterns PT1, PT2, and PT3 may have different shapes. As the plurality of patterns PT1, PT2, and PT3 have respective different shapes, a bit complex shape may be expressed.

The film part 813 may be disposed between the pattern part 811 and the first transparent film 815.

The film part 813 may have a predetermined light transmissivity rate, and output light LT, passing through the pattern PT, to the outside. The outside may be an interior or exterior of the vehicle 100.

The film part 813 may be a transflective film. The film part 813 may be formed of a polymer, such as polyethylene terephalate (PET), poly carbonate (PC), polystyrene (PS), and acrylate butadiene styrene (ABS).

The film part 813 may be attached to the transparent flexible printed circuit board 820 by, for example, using a hotmelt adhesive.

The first transparent film 815 may be disposed between the film part 813 and the surface 817.

The first transparent film 815 may control transmissivity of light which passes through the film part 813.

The first transparent film 815 may be formed of a transparent material, such as polyethylene terephalate (PET), poly carbonate (PC), poly imide (PI), polystyrene (PS), and polyacrylonitile (PAN).

The first transparent film 815 may be formed of a heat resistant material which has been heat annealed. As a result, the first transparent film 815 may have heat resistant properties.

The surface 817 may be disposed on the first transparent film 815.

The surface 817 may be formed of the same material as a material that forms the interior of the vehicle. For example, the surface 817 may be formed of a synthetic resin material, a fabric material, a leather material, a wood material, or a metal material.

The surface 817 may be divided into a region corresponding to a location of a pattern PT, and a region not corresponding to the location of the pattern PT.

The region of the surface 817 corresponding to the pattern PT may be thinner than the region of the surface 817 not corresponding to the pattern PT.

For example, a region of the surface 817 vertically overlapping the pattern PT may be thinner than a region of the surface 817 not vertically overlapping the pattern PT. Due to this structure, light passing through the pattern PT may be output well to the outside.

Hardness of the surface 817 may improve by hard coating. Due to the improved hardness, durability of the surface 817 may be maintained despite a countless number of user's touch.

The surface 817 may be coated with a self-healing material. When a surface is scratched, the self-healing material may repair the scratch by itself. The self-healing material is in a flexible structure of high-density polymers. Therefore, although the scratch occurs, the structure may be transformed without being ruptured.

Figure 18:
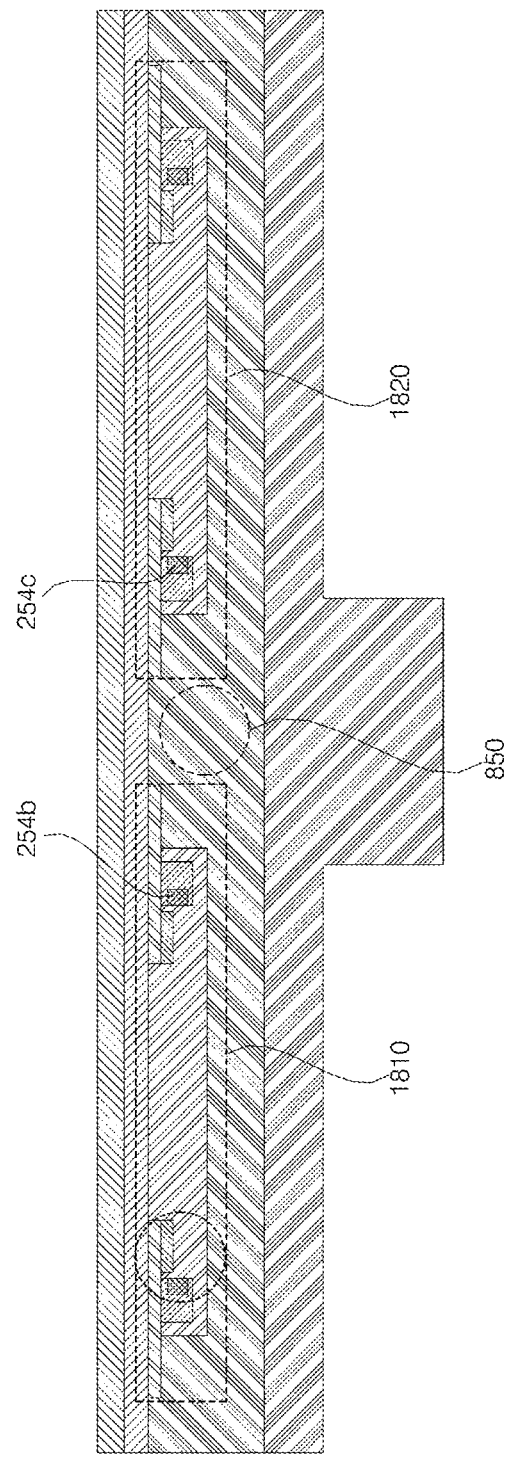
FIG. 18 is a diagram illustrating an example of a cross-sectional view of a user interface apparatus for vehicle according to an implementation.

FIG. 18 is a cross-sectional view of a user interface apparatus for vehicle according to an implementation. In particular, FIG. 18 is an exemplary view of a cut-away taken along line G-H of FIG. 10A.

Referring to FIG. 18, the light emitting unit 254 may include a plurality of light sources 254a which are respectively disposed in a plurality of separate regions 1810 and 1820.

The cover part 810 may include a plurality of patterns which are formed to correspond to a plurality of light sources and through which light generated by the plurality of light sources pass.

The plastic portion 850 may block light generated by the light sources 254a, so that the light does not leak from the plurality of separate regions 1810 and 1820 to the outside.

For example, the light emitting unit 254 may include a first light source 254b and a second light source 254c. The first light source 254b may be disposed in the first region 1810. The second light source 254c may be disposed in the second region 1820.

The cover part 810 may include a first pattern that is formed to correspond to the first light source 254b.

The cover part 810 may include a second pattern that is formed to correspond to the second light source 254c.

The first and second patterns are formed in the pattern part 811. The first and second patterns may be formed on the same layer in the pattern 811.

The plastic portion 850 may separate the first region 1810 and the second region 1820 from each other. The plastic portion 850 blocks light, generated by the first light source 254b, from leaking to the second region 1820. In addition, the plastic portion 850 blocks light, generated by the second light source 254c, from leaking to the first region 1810.

Figure 19:
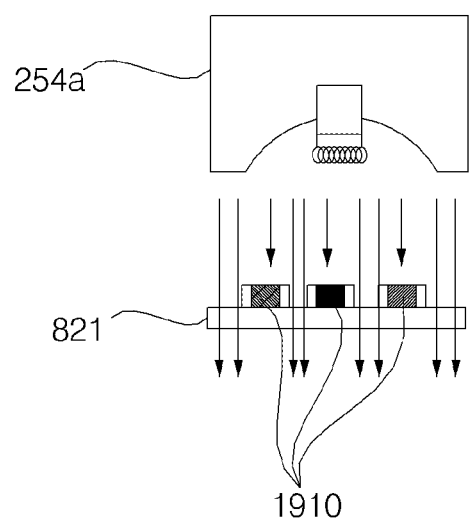
FIG. 19 is a diagram illustrating an example of an optical soldering technique according to an implementation.

FIG. 19 is a diagram for explanation of an optical soldering technique according to an implementation.

Referring to FIG. 19, the light source 254a may be mounted on a transparent flexible printed circuit board 821 using an optical soldering technique.

The optical soldering technique is a technique by which two or more items are jointed together by melting a solder bond material into the joint due to heat from absorption of light energy.

In the case of soldering the light source 254a to the transparent flexible printed circuit board 821, the optical soldering technique is used to allow visible light to be transmitted in a manner such that the light transfers energy to an adhesion region 1910, while simply passing through a non-adhesion region, so that only the adhesion region 1910 is supplied with the energy.

In the case of using the optical soldering technique, it is possible to minimize thermal damage to a device by controlling absorption and transmissivity of light.

Figure 20:
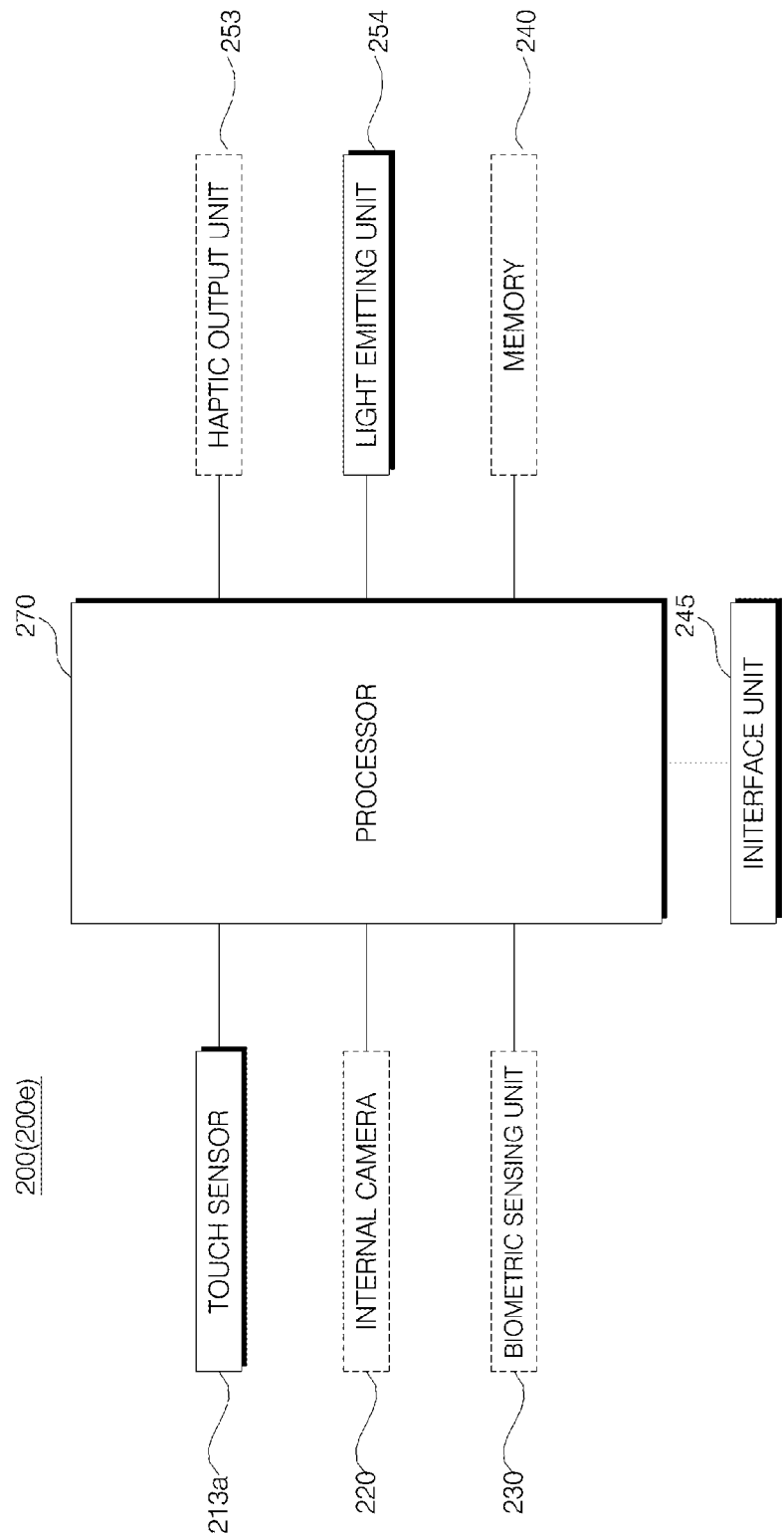
FIG. 20 is a block diagram illustrating an example of a user interface apparatus for vehicle, which is implemented as an ignition control apparatus, according to an implementation.

FIG. 20 is a block diagram illustrating a user interface apparatus for vehicle, which is implemented as an ignition control apparatus, according to an implementation.

Referring to FIG. 20, a user interface apparatus 200 may be implemented as an ignition control apparatus 200e. In this case, the user interface apparatus 200 may be referred to as the ignition control apparatus 200e.

The user interface apparatus 200 may include a touch sensor 213a, the interface unit 245, a light emitting unit 254, and a processor 270.

The touch sensor 213a may detect a user's touch. The touch sensed by the touch sensor 213a may be defined as a touch input.

The touch sensor 213a may be controlled by the processor 270. The touch sensor 213a may be activated or deactivated under control of the processor 270.

The interface unit 245 may exchange information, data, a data with another device included in a vehicle 100. The interface unit 245 may transmit information, data, or a signal generated or processed by the processor 270 to another device included in the vehicle 100. The interface unit 245 may receive information, data, or a signal from another device included in the vehicle 100.

The interface unit 245 may receive vehicle information from a different device included in the vehicle 100. Specifically, the interface unit 245 may receive information from at least one of an object detection apparatus 300, a communication apparatus 400, a driving manipulation apparatus 500, a controller 170, a vehicle drive apparatus 600, an operation system 700, a navigation system 770, and a sensing unit 120.

For example, the interface unit 245 may receive door opening/closing information.

For example, the interface unit 245 may receive safety belt status information.

For example, the interface unit 245 may receive brake pedal position information.

For example, the interface unit 245 may receive gear lever position information.

For example, the interface unit 245 may receive vehicle speed information

For example, the interface unit 245 may receive Idle Stop and Go (ISG) function on/off information.

For example, the interface unit 245 may receive vehicle location information.

For example, the interface unit 245 may receive seat position information.

For example, the interface unit 245 may receive audio volume control information.

The light emitting unit 254 may generate light and output the light. To this end, the light emitting unit 254 may include at least one light source 254a.

The light source 254a may be positioned to correspond to a pattern formed on a pattern member 811. There may be provided a plurality of light sources 254a.

The light emitting unit 254 may include a plurality of light sources. The plurality of light sources may be disposed to respectively correspond to a plurality of patterns formed on the pattern unit 811.

A light source may include at least one light emitting device.

The light emitting device may include various devices which convert electricity into light, but it is preferable that the light emitting device includes a light emitting diode (LED).

The light emitting unit 254 may be controlled by the processor 270. Under the control of the processor 270, the light emitting unit 254 may generate light and output the light.

The processor 270 may control the overall operation of each unit of the user interface apparatus 200.

The processor 270 may control the light emitting unit 254 to generate light in response to an event.

In some implementations, the event may be based on a user's input received via an input unit 210. The event may be based on information generated by an internal camera 220 or a biometric sensing unit 230. The event may be based on information, data, or a signal received via the interface unit 245 from a different device included in the vehicle 100.

When light is generated by the light emitting unit 254, the processor 270 may activate the touch sensor 213a.

When an event has not occurred, the processor 270 may control the touch sensor 213a to remain deactivated. While light is not generated by the light emitting unit 254, the processor 270 may control the touch sensor 213a to remain deactivated.

When an event has occurred, the processor 270 may activate the touch sensor 213a.

The processor 270 may control the light emitting unit 254 based on vehicle information.

The vehicle information may include at least one of the following: vehicle location information, vehicle speed information, gear lever position information, door opening/closing information, safety belt status information, brake pedal position information, Idle Stop and Go (ISG) function on/off information, passenger information, driver's biometric information, seat position information, and audio volume control information.

Upon receiving information related to opening of a driver's seat door, the processor 270 may control the light emitting unit 254 to generate light. In this manner, when the driver opens a door and get into a vehicle, the user interface apparatus 200 may cause the driver to recognize a location of the user interface apparatus 200.

Upon receiving information related to a fastened status of a safety belt of a driver seat, the processor 270 may control the light emitting unit 254 to generate light. In this manner, the ignition is turned on only when a driver has fastened a safety belt, and therefore, the safety of the driver may be secured.

Upon receiving information related to a fastened status of safety belts of all seats on which passengers are located, the processor 270 may control the light emitting unit 254 to generate light. In this manner, the ignition is turned on only when all the passengers have fastened safety belts, and thus, the safety of all the passengers may be secured.

Upon receiving the brake pedal position information based on a pressed brake pedal, the processor 270 may control the light emitting unit 254 to generate light. In this manner, the ignition is turned on only when a driver is pressing a brake pedal, and thus, the driver is allowed to prepare for any unexpected or dangerous situation which may happen after turning-on of the ignition.

Upon receiving gear lever position information indicative of a park position P or a neutral position N, the processor 270 may control the light emitting unit 254 to generate light.

Upon receiving gear lever position information indicative of a drive position D or a reverse position R, the processor 270 may control the light emitting unit 254 to not generate light. In this case, the processor 270 may control the touch sensor 213a to remain deactivated.

In this manner, the ignition is turned on only when a gear lever is in the parking position P or the neutral position N, and thus, it is possible to prevent an accident which may happen after turning-on of the ignition.

Upon receiving gear lever position information indicative of the drive position D or the reverse position R when the vehicle is parked, the processor 270 may provide a signal to output a warning.

In the case where a vehicle speed value is not zero, the processor 270 may control the light emitting unit 254 to not generate light. In the case where the vehicle is travelling, the processor 270 may control the light emitting unit 254 to not generate light. In this manner, when the vehicle is travelling, the user interface apparatus is inactivated to prevent the ignition from being turned off, thereby preventing an accident.

When an emergency situation occurs with a vehicle speed value other than zero, the processor 270 may control the light emitting unit 254 to generate light.

For example, the processor 270 may determine an emergency situation by receiving an emergency light turn-on signal via the interface unit 245.

For example, the processor 270 may determine an emergency situation by receiving information, acquired by an object detection apparatus 300, via the interface unit 245.

For example, the processor 270 may determine an emergency situation by receiving information, acquired by the sensing unit 120, via the interface unit 245.

In this manner, it is possible to turn off the ignition even when the vehicle is travelling, thereby preventing a more serious accident.

Upon receiving information indicating that an engine is not being operated based on an Idle Stop and Go (ISG) function, the processor 270 may control the light emitting unit 254 to not generate light. If a vehicle operates based on the ISG function, the vehicle is still in a driving state even though a vehicle speed value is zero and the engine is not being operated. In this case, the ignition control apparatus may be inactivated to prevent turning off the ignition.

When a location of the vehicle corresponds to a pre-registered area, the processor 270 may control the light emitting unit 254 to generate light.

For example, the pre-registered area may be an area within a predetermined distance from a user's home or company. When the vehicle 100 is located in the pre-registered area, it is necessary to turn on or turn off the vehicle to pull the vehicle 100 out of a parking space or to park the vehicle 100 in a parking space. Thus, the user interface apparatus 200 may be activated to be ready to receive the user's input.

In some implementations, the vehicle location information may be based on global positioning system (GSP) information acquired by a location information unit 420 or a vehicle surrounding image acquired by a camera 310.

The processor 270 may control the light emitting unit 254 to generate light based on seat position information.

The processor 270 may provide a signal to a seat adjustment device in response to a touch sensed by the touch sensor 213a.

In the case where the light emitting unit 254 includes a plurality of light sources 254a, the pattern member 811 of the cover part 810 may include a plurality of patterns which respectively correspond to the light sources 254a, so that lights generated by the plurality of light sources 254a pass through the plurality of patterns. In this case, the processor 270 may control at least one of the light sources 254a to generate light indicative of a particular seat position.

The processor 270 may control the light emitting unit 254 to generate light based on audio volume control information.

The processor 270 may provide a signal to an audio volume control apparatus in response to a touch sensed by the touch sensor 213a. The audio volume control apparatus may be a multimedia device.

In the case where the light emitting unit 254 includes a plurality of light sources 254a, the pattern member 811 of the cover may include a plurality of patterns which respectively correspond to the light sources 254a, so that light generated by the plurality of light sources 254a pass through the plurality of patterns. In this case, the processor 270 may control at least one of the light sources 254a to generate light indicative of a particular audio volume level.

When light is generated by the light emitting unit 254, the processor 270 may activate the touch sensor 213a.

In response to a touch input received by the activated touch sensor, the processor 270 may provide a signal to control a vehicle device.

In some implementations, the user interface apparatus 200 may further include an internal camera 220, a biometric sensing unit 230, a memory 240, and a haptic output unit 254 individually or in combination.

The internal camera 220 may acquire passenger information. The internal camera 220 may acquire an image of the inside of a vehicle. The internal camera 220 may provide location information of a passenger based on the acquired image. For example, the internal camera 220 may provide information indicating whether a passenger is located on a driver seat.

Upon receiving a touch input from a passenger other than a user located on the driver seat, the processor 270 may not provide a signal to control any one function among a plurality of control functions of the ignition device.

As a control signal is generated only in response to a touch input of the user located on the driver seat, it is possible to prevent malfunction that may occur due to a wrong input of a passenger other than a driver.

The biometric sensing unit 230 may acquire the driver's biometric information.

When the driver's biometric information matches information pre-stored in the memory 240, the processor 270 may control the light emitting unit 254 to generate light.

Only when a passenger is identified as a driver, the light emitting unit 254 is controlled to generate light and the touch sensor 213a is activated. In this manner, a person other than the driver is not allowed to turn on the ignition, so that it is possible to prevent vehicle theft.

Under the control of the processor 270, the haptic output unit 253 may output a vibration pattern corresponding to one of a plurality of control functions. The processor 270 may control the haptic output unit 253 to output a vibration pattern corresponding to one of the plurality of control functions.

The haptic output unit 253 may be provided on a steering wheel, a safety belt, and a seat. In some implementation, the haptic output unit 253 may be disposed on a region of a dash board. In the case where the user interface apparatus 200 is implemented as an ignition control apparatus, the haptic output unit 253 may be disposed near an ignition button shape 1710.

For example, when a first function operates, the processor 270 may control the haptic output unit 253 to output a first vibration pattern. When a second function operates, the processor 270 may control the haptic output unit 253 to output a second vibration pattern. When a third function operates, the processor 270 may control the haptic output unit 253 to output a third vibration pattern. The first to third vibration patterns may be different in a vibration cycle, the number of vibration, or vibration duration.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface apparatus for a vehicle, comprising:
   a circuit part injection-molded body formed in an insert injection process in which first resin melt is injected in a state in which a circuit part has been inserted; and
   a cover part injection-molded body coupled to the circuit part injection-molded body, and formed in an insert injection process in which second resin melt is injected in a state in which a cover part has been inserted,
   wherein the circuit part comprises:
      a light emitting unit;
      a touch sensor configured to detect a touch input;
      at least one processor;
      a computer-readable medium having stored thereon instructions that, when executed by the at least one processor, cause the at least one processor to perform operations comprising:
         controlling the light emitting unit in response to an event to generate light;
         activating the touch sensor in response to generation of the light; and
         generating a signal for controlling a vehicle device in response to a touch input received via the activated touch sensor; and
      a transparent flexible printed circuit board on which the light emitting unit, the touch sensor, the at least one processor, and the computer-readable medium are arranged,
   wherein, in a state in which the light is generated by the light emitting unit, the cover part allows the light to pass therethrough and illuminate a shape on the cover part.

2. The user interface apparatus according to claim 1, further comprising:
   a light diffusion member that is formed by injecting the first resin melt and that is configured to transmit the light that is generated by the light emitting unit toward the cover part.

3. The user interface apparatus according to claim 2, wherein the light diffusion member is formed to cover a light-emitting portion of the light emitting unit.

4. The user interface apparatus according to claim 2, wherein the light diffusion member is formed to surround the light emitting unit.

5. The user interface apparatus according to claim 1, further comprising:
   a buffer member that is formed by injecting the second resin melt and that is configured to form a smoothed surface over at least one protrusion in the circuit part.

6. The user interface apparatus according to claim 5, wherein the buffer member is formed of a transparent material.

7. The user interface apparatus according to claim 5, wherein the cover part is formed to surround an edge of the buffer member.

8. The user interface apparatus according to claim 1, further comprising:
   a plastic portion configured to support reflection of the light generated by the light emitting unit.

9. The user interface apparatus according to claim 8, wherein the plastic portion is formed in an insert injection process in which a third resin melt is injected in a state in which the circuit part injection-molded body and the cover part injection-molded body have been inserted.

10. The user interface apparatus according to claim 9, wherein:
    the light emitting unit comprises a plurality of light sources respectively disposed in a plurality of separate regions,
    the cover part comprises a plurality of patterns which is formed to respectively correspond to the plurality of light sources, wherein light that is generated by the plurality of respective light sources pass through the plurality of patterns, and
    the plastic portion is configured to block light, generated by the plurality of respective light sources, from leaking from the plurality of separate regions to an outside of the user interface apparatus.

11. The user interface apparatus according to claim 9, wherein the cover part injection-molded body further comprises a buffer member that is formed by injecting the second resin melt and that is configured to form a smoothed surface over at least one protrusion in the circuit part, and
    wherein the plastic portion is formed to surround an edge of the buffer member.

12. The user interface apparatus according to claim 8, wherein the plastic portion comprises a coupling assembly that is configured to couple with a vehicle component.

13. The user interface apparatus according to claim 1, wherein the cover part comprises:
    a pattern part comprising a pattern that corresponds to the shape that is configured to be illuminated on the cover part, the pattern part configured to allow the light to pass through the pattern; and
    a film part having a predetermined light transmissivity rate and configured to allow light, passing through the pattern, to be output to an outside of the user interface apparatus.

14. The user interface apparatus according to claim 13, wherein the cover part further comprises a surface that is formed on the film part and that is formed of a synthetic resin material, a fabric material, a leather material, a wooden material, or a metal material, and
    wherein a region of the surface corresponding to the pattern is thinner than a region of the surface not corresponding to the pattern.

15. The user interface apparatus according to claim 1, further comprising:
    a light guide film configured to transfer light, generated by the light emitting unit, to the cover part.

16. The user interface apparatus according to claim 15, wherein the light guide film is configured to uniformly transfer the light, generated by the light emitting unit, to the cover part and illuminate the shape on the cover part.

17. The user interface apparatus according to claim 15, further comprising:
    an optical clear film configured to guide the light, generated by the light emitting unit, to the light guide film.

18. The user interface apparatus according to claim 1, further comprising:
    a color film configured to change a wavelength of light generated by the light emitting unit.

19. The user interface apparatus according to claim 1, wherein the operations further comprise:
    based on a first touch input being detected by the touch sensor, controlling the light emitting unit to generate light in response to the first touch; and
    based on a second touch input being detected by the touch sensor, providing a signal for controlling a vehicle device in response to the second touch.

20. A vehicle comprising:
a plurality of wheels;
a power source configured to drive at least one of the plurality of wheels; and
a user interface apparatus comprising:
   a circuit part injection-molded body formed in an insert injection process in which first resin melt is injected in a state in which a circuit part has been inserted; and
   a cover part injection-molded body coupled to the circuit part injection-molded body, and formed in an insert injection process in which second resin melt is injected in a state in which a cover part has been inserted,
wherein the circuit part comprises:
   a light emitting unit;
   a touch sensor configured to detect a touch input;
   at least one processor configured to:
      control the light emitting unit in response to an event to generate light;
      activate the touch sensor in response to generation of the light; and
      generate a signal for controlling a vehicle device in response to a touch input received via the activated touch sensor; and
   a transparent flexible printed circuit board on which the light emitting unit, the touch sensor, and the at least one processor are arranged,
wherein, in a state in which the light is generated by the light emitting unit, the cover part allows the light to pass therethrough and illuminate a shape on the cover part.

21. A method of manufacturing a user interface apparatus for vehicle, the method comprising:
   manufacturing a circuit part injection-molded body in an insert injection process in which first resin melt is injected in a state in which a circuit part has been inserted into a first mold;
   manufacturing a cover part injection-molded body in an insertion injection process in which second resin melt is injected when in a state in which a cover part has been inserted into a second mold;
   bonding the circuit injection-molded body and the cover part injection-molded body; and
   performing an insert injection process in which a third resin melt is injected in a state in which the circuit part injection-molded body and the cover part injection-molded body have been inserted into a third mold while being bonded to each other,
wherein the circuit part comprises:
   a light emitting unit;
   a touch sensor configured to detect a touch input;
   at least one processor; and
   a transparent flexible printed circuit board on which the light emitting unit, the touch sensor, and the at least one processor are arranged, and
wherein, in a state in which light is generated by the light emitting unit in response to a touch input received by the touch sensor, the cover part allows the light to pass therethrough and illuminate a shape on the cover part.

22. A user interface apparatus for a vehicle, comprising:
a circuit part injection-molded body comprising a first resin melt and a circuit part; and
a cover part injection-molded body coupled to the circuit part injection-molded body, and comprising a second resin melt and a cover part,
wherein the circuit part comprises:
   a light emitting unit;
   a touch sensor configured to detect a touch input;
   at least one processor;
   a computer-readable medium having stored thereon instructions that, when executed by the at least one processor, cause the at least one processor to perform operations comprising:
      controlling the light emitting unit in response to an event to generate light;
      activating the touch sensor in response to generation of the light; and
      generating a signal for controlling a vehicle device in response to a touch input received via the activated touch sensor; and
   a transparent flexible printed circuit board on which the light emitting unit, the touch sensor, the at least one processor, and the computer-readable medium are arranged,
wherein, in a state in which the light is generated by the light emitting unit, the cover part allows the light to pass therethrough and illuminate a shape on the cover part.

23. The user interface apparatus according to claim 22, further comprising:
a light diffusion member that comprises the first resin melt arranged around the light emitting unit and that is configured to transmit the light that is generated by the light emitting unit toward the cover part.

* * * * *